United States Patent
Murdock

(10) Patent No.: US 10,315,931 B2
(45) Date of Patent: Jun. 11, 2019

(54) SYSTEMS AND METHODS FOR INTERRELATED CONTROL OF CHLORINATORS AND PUMPS

(71) Applicant: Hayward Industries, Inc., Elizabeth, NJ (US)

(72) Inventor: James Murdock, Wakefield, RI (US)

(73) Assignee: Hayward Industries, Inc., Elizabeth, NJ (US)

( * ) Notice: Subject to any disclaimer, the term of this patent is extended or adjusted under 35 U.S.C. 154(b) by 182 days.

(21) Appl. No.: 15/115,125

(22) PCT Filed: Jan. 28, 2014

(86) PCT No.: PCT/US2014/013390
§ 371 (c)(1),
(2) Date: Jul. 28, 2016

(87) PCT Pub. No.: WO2015/116035
PCT Pub. Date: Aug. 6, 2015

(65) Prior Publication Data
US 2016/0340205 A1   Nov. 24, 2016

(51) Int. Cl.
*C02F 1/00* (2006.01)
*C02F 1/467* (2006.01)
(Continued)

(52) U.S. Cl.
CPC ............ *C02F 1/008* (2013.01); *C02F 1/4674* (2013.01); *E04H 4/1209* (2013.01);
(Continued)

(58) Field of Classification Search
None
See application file for complete search history.

(56) References Cited

U.S. PATENT DOCUMENTS

| 5,985,155 A | 11/1999 | Maitland |
| 2008/0237148 A1 | 10/2008 | Dennis et al. |

(Continued)

FOREIGN PATENT DOCUMENTS

| AU | 2013100126 A4 | 3/2013 |
| WO | 2011/143736 A1 | 11/2011 |

OTHER PUBLICATIONS

International Search Report of the International Searching Authority dated May 9, 2014, issued in connnection with International Application No. PCT/US14/13390 (3 pages).
(Continued)

*Primary Examiner* — Chester T Barry
(74) *Attorney, Agent, or Firm* — McCarter & English, LLP

(57) ABSTRACT

Systems and methods for combined controlling chlorinators and pumps for pools and spas are provided. Exemplary embodiments can include a pump operable to circulate a fluid for a specified time period according to a pump operation time setting and a chlorinator operatively coupled to the pump. The chlorinator can be configured to generate chlorine based on a chlorine output setting, a chlorine generation capacity of the chlorinator, and the pump operation time. A controller can be operatively coupled to the chlorinator and the pump and can be programmed to control the chlorinator and the pump based on a relationship between the chlorine output setting, a chlorine generation capacity of the chlorinator, and the pump operation time.

27 Claims, 17 Drawing Sheets

(51) Int. Cl.
*E04H 4/12* (2006.01)
*C02F 103/42* (2006.01)

(52) U.S. Cl.
CPC ........ *E04H 4/1281* (2013.01); *C02F 2103/42* (2013.01); *C02F 2201/002* (2013.01); *C02F 2201/005* (2013.01); *C02F 2201/4612* (2013.01); *C02F 2201/4615* (2013.01); *C02F 2209/003* (2013.01); *C02F 2209/005* (2013.01); *C02F 2209/006* (2013.01); *C02F 2209/29* (2013.01); *C02F 2303/04* (2013.01)

(56) References Cited

U.S. PATENT DOCUMENTS

| | | | |
|---|---|---|---|
| 2010/0254825 | A1 | 10/2010 | Stiles, Jr. et al. |
| 2011/0290707 | A1 | 12/2011 | Porat |
| 2014/0034562 | A1* | 2/2014 | Wallace .................. C02F 1/008 |
| | | | 210/138 |

OTHER PUBLICATIONS

Written Opinion of the International Searching Authority dated May 9, 2014, issued in connnection with International Application No. PCT/US14/13390 (8 pages).
European Search Report dated Jul. 27, 2017, issued in connection with European Patent Application No. 14880968 (9 pages).

\* cited by examiner

SYSTEMS AND METHODS FOR INTERRELATED CONTROL OF CHLORINATORS AND PUMPS

RELATED APPLICATIONS

This application is a U.S. National Phase Application under 35 U.S.C. 371 of International Application No. PCT/US2014/013390 filed Jan. 28, 2014, which was published on Aug. 6, 2015 under International Publication Number WO 2015/116035. The disclosure of this application is incorporated herein by reference in its entirety.

BACKGROUND

Technical Field

The present disclosure relates generally to equipment for sanitizing bodies of water such as pools and spas. More specifically, the present disclosure relates to systems and methods for controlling chlorinators and pumps in a sanitization and filtering system for bodies of water.

Related Art

In the pool and spa field, it is important that water be adequately sanitized to prevent the growth of microorganisms, algae, etc. Adequate sanitization is important not only to protect the health and safety of bathers, but to also ensure proper water clarity in a pool or spa. A number of sanitization techniques have been implemented to sanitize pool/spa water, such as chemical additives (e.g., chlorine, bromine, etc.), introduction of ozone into pool/spa water, ultraviolet sanitization, etc.

Electrolytic cells (or, so-called "salt chlorinators") represent one way of sanitizing a pool or spa. In this arrangement, an amount of salt (sodium chloride) is periodically added to pool or spa water (e.g., a few times per year), an electric charge is imparted on the electrolytic cell, and pool or spa water is pumped through the cell. Through electrolysis, the salt in the water is converted to free chlorine, which is subsequently pumped into the pool or spa to sanitize water. One advantage to this approach is a reduction in the amount of chemicals that need to periodically be added to pool or spa water, in contrast to conventional chemical chlorination techniques which require frequent addition of dry or liquid chemicals to the pool/spa (e.g., by way of powder, tablets, etc.) in order to sanitize same.

Conventional chlorinators often only attempt to display and allow setting of the chlorine feed rate taking place when a filter pump is running. The displays and settings of these conventional chlorinators typically do not change if the filter schedule is changed, even though the actual dosing of chlorine can be and is often dramatically impacted by the filter schedule. Because the codependence between the chlorine feed rate and the filter schedule is often not illustrated or managed by the conventional chlorinator controllers or system controllers, the chlorine output displayed to a user often misrepresents the chlorine output levels of the chlorinator to the user and can, in some instance, can affect the quality of the water being treated by the chlorinator.

SUMMARY

The present disclosure relates to systems and methods for combined control of chlorinators, such as electrolytic chlorinators, and pumps, such as filter pumps for pools and spas.

Exemplary embodiments of the system can include one or more controllers which can communicate with a processor positioned within a replaceable cell cartridge of a chlorinator as well as with a pump (e.g., via a pump controller), to allow for remote control of the chlorinator and/or cell cartridge and the pump based on, for example, a specified chlorine output setting of the chlorinator, and/or a specified pump operation time of the pump defined by, for example, a specified filter schedule. In accordance with embodiments of the present disclosure, a system for controlling the chlorine output of a chlorinator and a circulation schedule of a pump operatively coupled to the chlorinator is disclosed. The pump operable to circulate a fluid according to a pump operation time setting (e.g., a filter pump schedule). Fluid is circulated through the chlorinator by the pump. The system includes a controller operatively coupled to the chlorinator and the pump. The controller accepts settings from a user for the pump operation time setting and the chlorine output setting and the controller is programmed to automatically control the chlorinator and the pump based on a relationship between the chlorine output setting, a chlorine generation capacity of the chlorinator, and the pump operation time setting.

In accordance with embodiments of the present disclosure, a method of controlling a chlorine feed rate of a chlorinator and an operation time of a pump operatively coupled to the chlorinator is disclosed. The method includes receiving an input from a user via a control panel associated with a controller operatively coupled to the chlorinator and the pump. The chlorinator has a configurable chlorine output setting and the pump has a configurable pump operation time setting. The method further includes controlling the chlorinator feed rate and the pump based on a relationship between the chlorine output setting, a chlorine generation capacity of the chlorinator, and the pump operation time setting.

In accordance with embodiments of the present disclosure, a method of determining a chlorine feed rate of a chlorinator and a schedule of operation for a pump operatively coupled to the chlorinator is disclosed. The method includes receiving an input from a user to adjust a chlorine output setting via a control panel associated with a controller operative coupled to a chlorinator and a pump. The chlorinator has a configurable chlorine feed rate and the pump has a configurable pump operation time. The method further includes determining at least one of the chlorinator feed rate or the pump operation time to be set to achieve the chlorine output setting and indicating to the user that an adjustment of at least one of the chlorine feed rate or the pump operation time is required to achieve the chlorine output setting. In accordance with embodiments of the present disclosure, the controller can be programmed to automatically control a chlorine feed rate of the chlorinator or the pump operation time to achieve the chlorine output. The controller can receive an input from a user increasing the chlorine output setting and the controller can be programmed to determine whether to increase the chlorine feed rate or the pump operation time to achieve the chlorine output setting. If the controller determines that the chlorine feed rate cannot be adjusted to achieve the specified chlorine output setting, the controller can increase the pump operation time setting or can indicate to the user that the pump operation time setting should be increased to achieve the specified chlorine output setting. If the controller determines that the chlorine feed rate can be adjusted to achieve the specified chlorine output setting, the controller can increase the chlorine feed rate or can indicate to the user that the chlorine feed rate should be increased to achieve the specified chlorine output setting.

When the chlorine feed rate is increased, the controller can maintain the pump operation time and/or can adjust the pump operation time.

In accordance with embodiments of the present disclosure, when the controller receives an input from a user decreasing the chlorine output setting, the controller can be programmed to decrease the chlorine feed rate while maintaining the pump operation time as unchanged or can indicate to the user that the chlorine feed rate should be decreased to achieve the chlorine output setting.

In accordance with exemplary embodiments of the present disclosure, when the pump operation time setting is decreased, the controller can be programmed to determine whether the chlorine feed rate is adjustable to maintain the chlorine output setting. If the chlorine feed rate is adjustable to maintain the chlorine output setting, the controller increases the chlorine feed rate in response to a determination that the chlorine feed rate is adjustable to maintain the chlorine output setting and the controller maintains the chlorine output setting or the controller indicates that the chlorine feed rate should be increased to achieve the chlorine output setting. If not, the controller decreases the chlorine output setting in response to the determination that the chlorine feed rate is not adjustable to maintain the chlorine output setting or indicates to the user that the chlorine output setting cannot be based on the current chlorine feed rate. In accordance with embodiments of the present disclosure, a control panel can be utilized that has a display configured to provide a visual indication of the chlorine output setting and the controller can be programmed to interact with the display to change the visual indication based on a decrease of the chlorine output setting.

In some embodiments, the controller controls an operation of the pump indirectly via another controller.

By programmatically controlling the chlorinator and the pump to adjust an operation of the chlorinator or pump in response to changes in the operation of the chlorinator and/or the pump, exemplary embodiments can advantageously account for the impact of the filter schedule (e.g., the pump operation time per day). This allows for the display and settings of the chlorinator to accurately reflect the levels of chlorine actually being delivered to the body of water. When a user requests more or less chlorine, exemplary embodiments of the present disclosure can simultaneously (or on a priority basis) change the chlorine feed rate and/or the filter schedule to achieve the requested chlorine output levels.

Any combination or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

The foregoing features of the invention will be apparent from the following Detailed Description, taken in connection with the accompanying drawings, in which.

DETAILED DESCRIPTION

The present disclosure relates to systems and methods for controlling chlorinators, as discussed in detail below in connection with FIGS. 1-17.

Exemplary embodiments of the present disclosure advantageously overcome the limitations of convention systems by providing combined chlorine generator and filter pump controls that can be executed to ensure that a chlorine output setting displayed to a user accurately represents an amount of chlorine being generated by the chlorinator in a specified time period (e.g., per day), regardless of chlorine feed rate of the chlorinator or a pump operation time setting associated with a filter schedule for a body of water. As one non-limiting example, exemplary embodiments of the present disclosure can advantageous increase a pump operation time setting as needed to truly increase the chlorine output level by a specified amount when a user requests the specified amount of chlorine over a specified time period. As another non-limiting example, exemplary embodiments of the present disclosure can advantageously decrease the chlorine output level displayed to a user when a pump operation time is decreased and an adjustable chlorine feed rate cannot be increased to compensate for the decreased pump operation time.

While exemplary embodiments are described relative to a daily chlorine output setting, those skilled in the art will recognize that other time periods can be implemented, such as hourly chlorine output settings, weekly chlorine output settings, monthly chlorine output settings, and so on.

Figure 1:
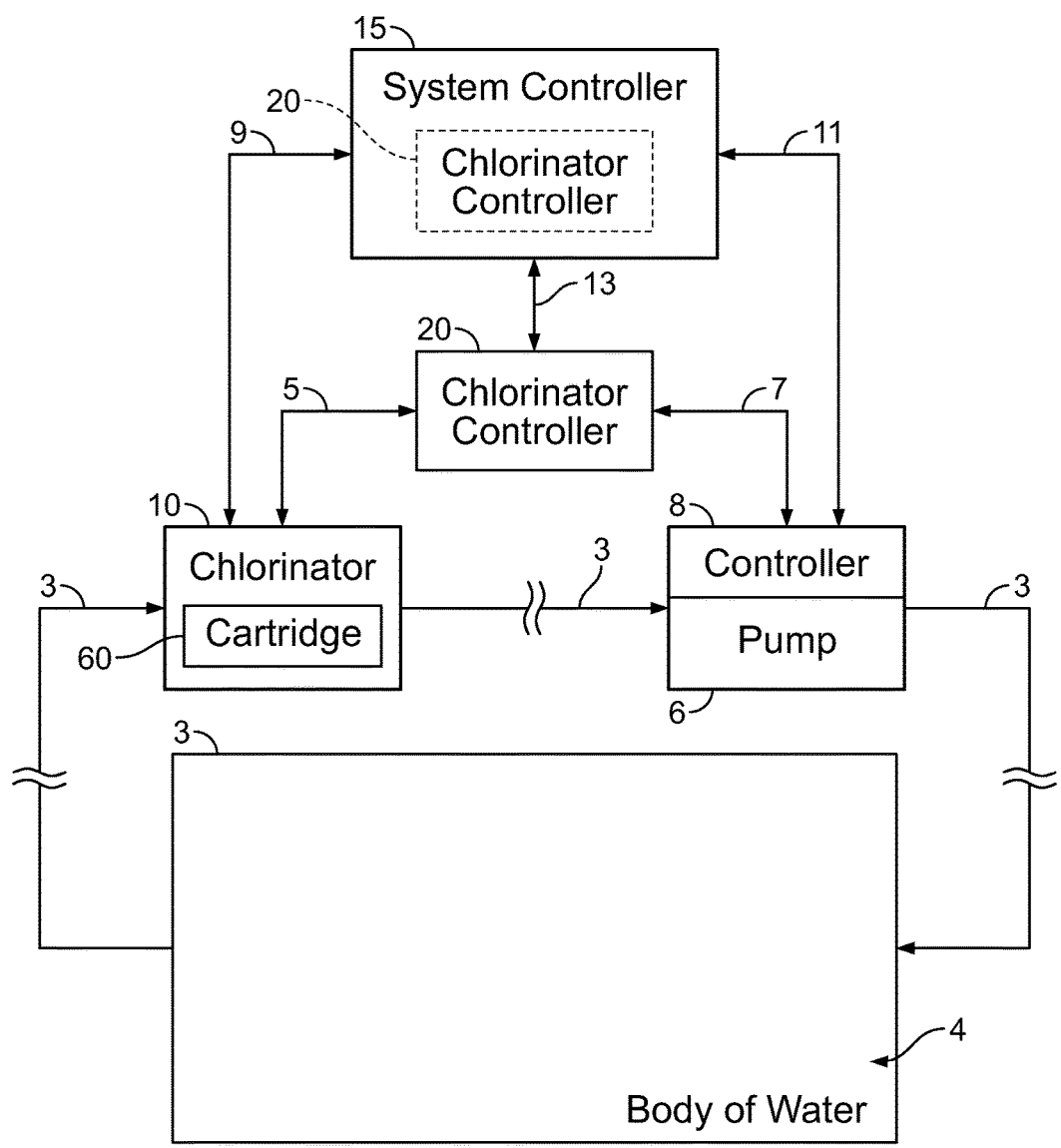
FIG. 1 is a perspective view of an exemplary filtration and sanitization system that includes a chlorinator, a filter pump and one or more controllers associated therewith in accordance with exemplary embodiments of the present disclosure.

FIG. 1 is a block diagram of an exemplary system 2 for sanitizing, filtering, and circulating water 3 contained in a body of water 4 (e.g., a pool or spa). The system can include a pump 6 (e.g., a variable speed pump) having an associated pump controller 8, a chlorinator 10 including a replaceable chlorinator cartridge 60, which is discussed in more detail below, a main system controller 15, and a chlorinator controller 20. The pump 6 can be a filter pump associated with a filter (e.g., a sand filter) (not shown) that filters debris and contaminates from the water 3. The chlorinator controller 20 can be communicatively coupled to the chlorinator 10, as shown by line 5, and can be communicatively coupled to the pump controller 8, as shown by line 7. The system controller 15 can be communicatively coupled to the chlorinator 10, as shown by line 9, the pump controller 8, as shown by line 11, and the chlorinator controller 20, as shown by line 13.

In some embodiments, the system controller 15 and/or the chlorinator controller 20 can be operatively coupled to the chlorinator 10 and the pump controller 8 via cables over which electrical signals can be transmitted and received. The system controller 15 can manage and coordinate different operations and functions carried out by various components of the system 2. For example, in some embodiments, the system controller 15 can be used to program and configure operation/function schedules, filter schedules, sanitization schedules, lighting schedules, and the like. The chlorinator controller 20 can be programmed and/or configured to interact with the chlorinator to control a daily chlorine output of the chlorinator 10 and/or to control an operation of the pump. For example, the controller 20 can accept settings from a user for the pump operation time setting (e.g., a number of hours per day the pump is scheduled to operate) and the chlorine output setting and the controller can be programmed to automatically control the chlorinator and the pump based on a relationship between the chlorine output setting, a chlorine generation capacity of the chlorinator, and the pump operation time setting. In exemplary embodiments, the relationship between the chlorine output setting (C %), the chlorine generation capacity (Clbs), and the pump operation time setting (PT) can be expressed mathematically as:

$$\text{Chlorine Feed Rate} = (C\%/100)*(Clbs/PT) \quad (1)$$

The daily chlorine output of the chlorinator 10 corresponds to a percentage that is determined based on a chlorine feed rate of the chlorinator 10 and a pump operation time setting of the pump 6 and can correspond to a percentage of a chlorine generation capacity that can be output from the chlorinator per day. For example, the chlorine generation capacity of the chlorinator 10 (e.g., a maximum amount of chlorine that can be generated and and/or delivered by the chlorinator) can be one and a half pounds (1.5 lbs) per day at a chlorine output setting of one hundred percent (100%). Each ten percent (10%) increment in the chlorine output setting can correspond to 0.15 lbs of chlorine per day. The chlorine feed rate corresponds to an amount of time that the chlorinator 10 outputs chlorine during an operational cycle of the chlorinator 10. For example, if the operational cycle of the chlorinator is three hours (3 hrs), a chlorine feed rate of fifty percent (50%) can result in an output of chlorine by the chlorinator for one and half hours (1.5 hrs). The chlorine feed rate and the pump operation time can both impact the daily chlorine output from the chlorinator.

As a non-limiting example, a daily chlorine output of fifty percent (50%) corresponds to outputting chlorine from the chlorinator 10 at a chlorine feed rate of one hundred percent (100%) for twelve hours of a day to produce 0.75 lbs of chlorine per day when the chlorine generation capacity of the chlorinator is 1.5 lbs per day. For this example, the pump operation time setting must be at least twelve hours a day to circulate a sufficient amount of the water 3 through the chlorinator 10 to achieve the desired daily chlorine output. It is possible to achieve a set daily chlorine output by appropriately controlling the chlorine feed rate and the pump operation time to achieve a chlorine output setting.

While the chlorinator controller 20 is shown as being separate and distinct from the system controller 15 in the present embodiment, those skilled in the art will recognize that the chlorinator controller 20 and/or the processes implemented thereby (shown in phantom) can be incorporated and/or integrated into the system controller 15 in other exemplary embodiments. Furthermore, while the present embodiment includes a pump controller for controlling an operation of a pump in response to inputs, those skilled in the art will recognize that in other exemplary embodiments the system controller 15 and/or chlorinator controller 20 can directly control an operation of the pump 6 (e.g., the pump controller 8 may be omitted in certain embodiments).

In exemplary embodiments, the pump 6 can be controlled by the pump controller 8 to circulate water 3 from the body of water 4 through the chlorinator 10, which can be controlled by the chlorinator controller 20 to generate chlorine via the cartridge 60. As described in more detail below, a user can interface with the chlorinator controller 20 to increase and/or decrease a quantity of chlorine output by the chlorinator 10 over a specified time period, such as daily. Simply increasing or decreasing the desired chlorine output per day, without determining and/or adjusting an operation of the pump 6, does not guarantee that the a desired quantity of chlorine is output. For example, if a user desires to introduce a specific quantity of chlorine per day into the body of water 4, the user can interface with a control panel of the controller 20 to set the chlorinator 10 to the desired output, but if the pump does not operate for a sufficient amount of time during the day and/or the chlorine feed rate is not appropriately set, the desired chlorine output from the chlorinator 10 for the day may not be reached.

To achieve a desired chlorine output over a specified time period, exemplary embodiments of the controller 20 and/or the controller 15 can interact, directly or indirectly, with the pump controller 8 to determine and/or adjust an operation of the pump 6. As one non-limiting example, when a user sets the chlorinator 10 to increase the daily output of chlorine (e.g., via the controller 20), the controller 20, either directly or indirectly via the controller 15, determines whether the pump operates for a sufficient amount of time during the day (i.e. based on the pump operation time setting) to achieve the set chlorine output. If not, the controller 20 can instruct, either directly or indirectly via the controller 15, the pump controller 8 to increase a pump operation time per day of the pump 6 to ensure that the pump operates for a sufficient amount of time during the day to achieve the set chlorine output. In some embodiments, the quantity of time that the pump is operational can be substantially proportional to the set daily chlorine output and/or chlorine feed rate. As another non-limiting example, when a user sets the chlorinator 10 to decrease the output of chlorine per day (e.g., via the controller 20), the controller 20, either directly or via the controller 15, determines whether the pump operation time can be decreased and/or the set chlorine feed rate can be reduced.

In exemplary embodiments, a user can interface with the pump controller 8, either directly or via one or both of the controllers 15 and 20 to adjust an operation of the pump over a specified time period and the controllers 15 and/or 20 can be programmed and/or configured to adjust the daily chlorine output of the chlorinator 10 accordingly. As a non-limiting example, if the user decreases the pump operation time, but retains the daily chlorine output setting (e.g., the user has not changed the desired chlorine output), the chlorine controller 20 can interact with the chlorinator 10 to increase the chlorine feed rate to achieve the desired daily chlorine output within the decreased pump operation time.

Figure 2:
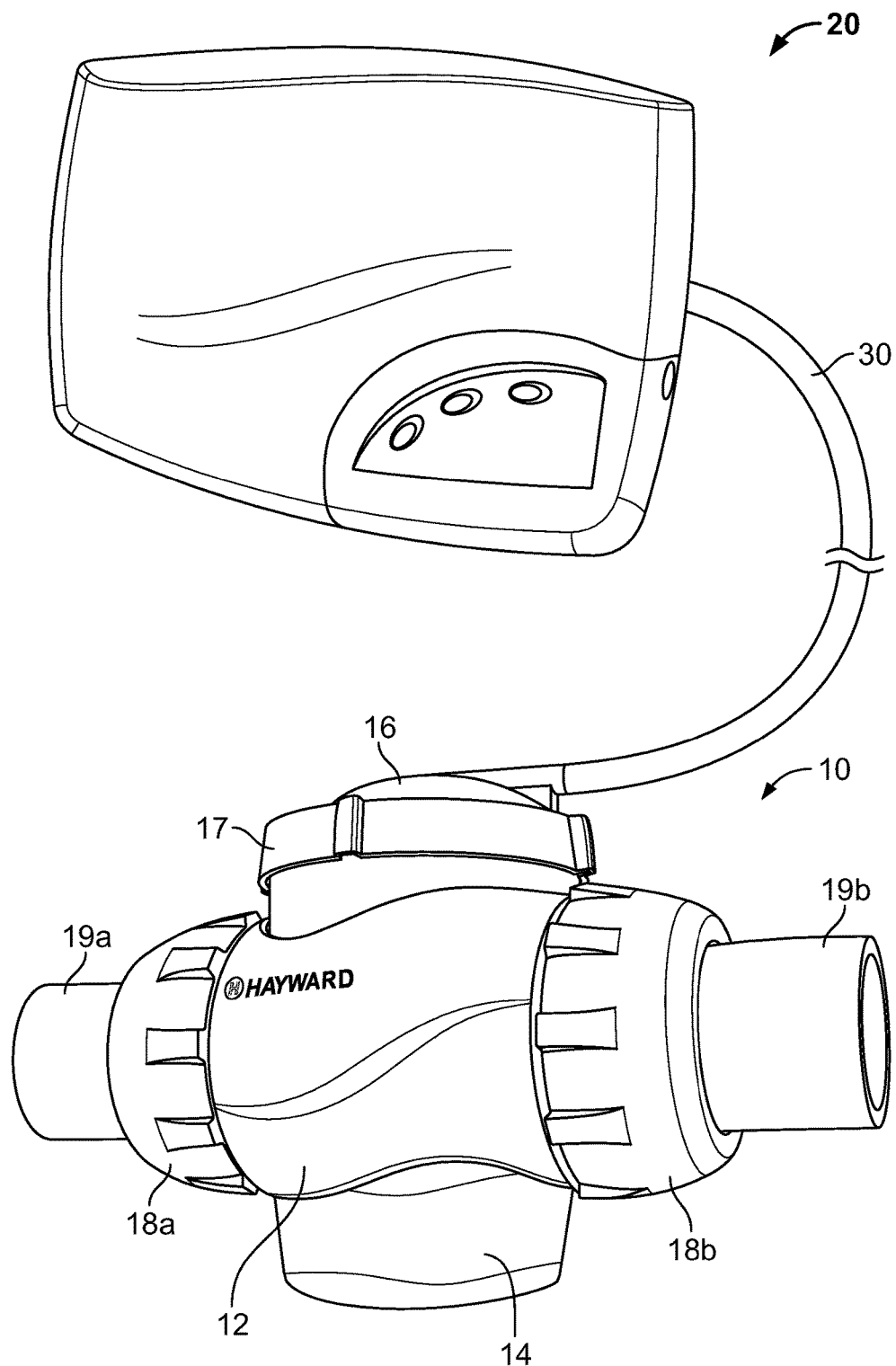
FIG. 2 is a perspective view of a controller and chlorinator in accordance with exemplary embodiments of the present disclosure.

FIG. 2 is a perspective view of a controller 10 and a chlorinator 20 of the present disclosure, interconnected by a cable 30. The chlorinator 10 includes a casing 12, a transparent or translucent body 14, a screw cap 17, a first compression nut 18a, and a second compression nut 18b. The nuts 18a, 18b permit connection of a first pipe 19a and a second pipe 19b (such pipes forming part of the overall piping of a pool/spa equipment installation) to the chlorinator 10. The body 14 a houses a chlorinator cartridge (or cell, both terms being used interchangeably herein) 60 (see FIG. 6), discussed in greater detail below. The cable 30 extends from the controller 20 and connects to a cartridge lid 16 that couples to the chlorinator cartridge 60, both electrically and mechanically. The cable 30 extends from the exterior of the cartridge lid 16 to the interior, and by way of a plug, provides power and electrical communication between the controller 20 and the chlorinator cartridge 60. The cable 30 is sealed to the lid 16 so that no water (e.g., pool/spa water or rain water) can enter the chlorinator 10 and damage the internal circuitry. The cartridge lid 16 is sealingly secured to the chlorinator cartridge 60. The water-tight connection created by the screw cap 17 restricts any water from entering the chlorinator 10. It is noted that communication between the chlorinator 10 and the controller 20 could also be provided by way of a wireless connection in place of the cable 30.

Figure 3:
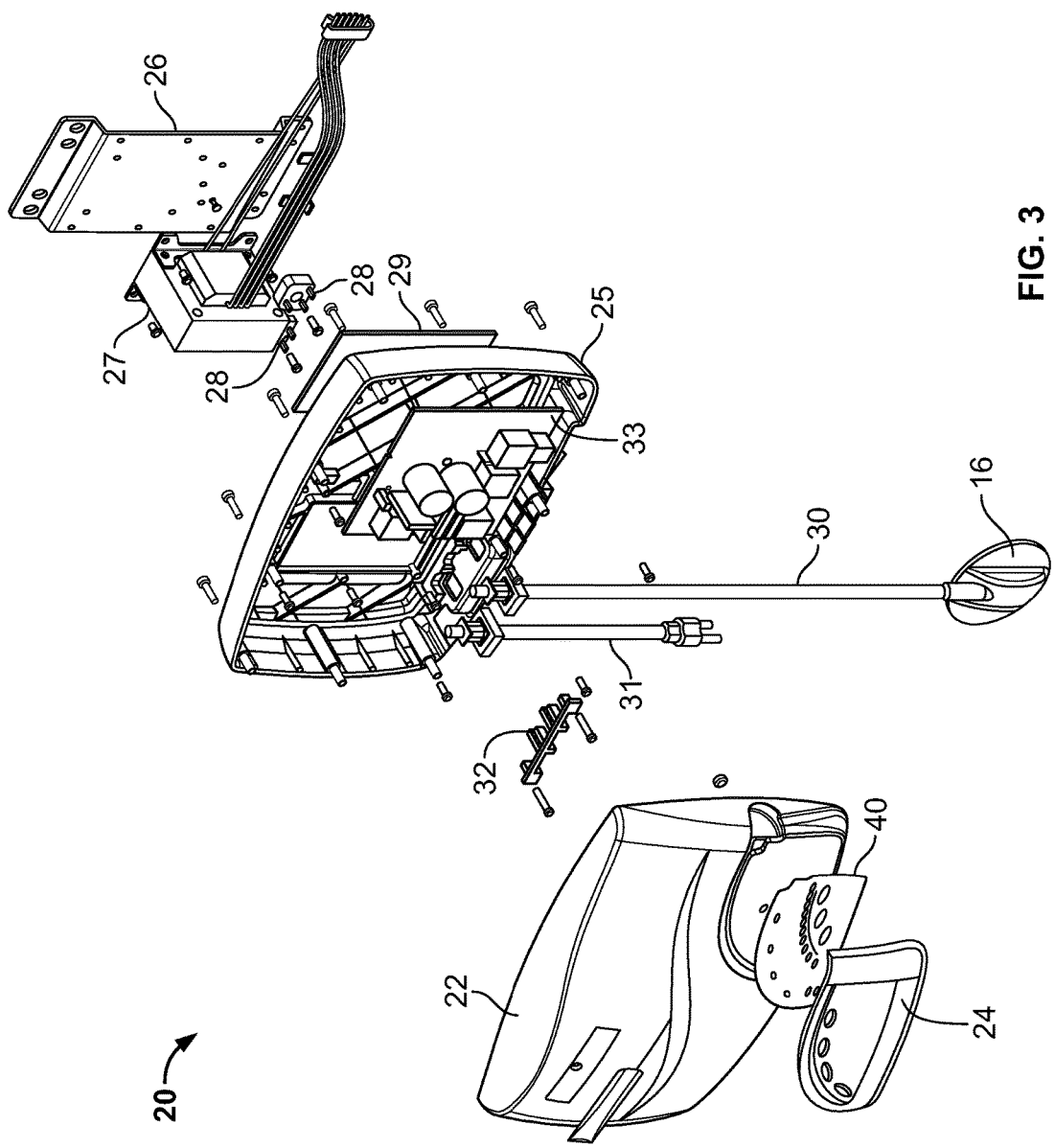
FIG. 3 is an exploded view of an exemplary embodiment of a controller of the present disclosure for controlling a chlorinator and/or a pump.

FIG. 3 is an exploded view of the controller 20. The controller 20 includes a front housing portion 22 having a movable cover 24, and a rear housing portion 25 attached to the front housing portion 22. An optional mounting plate 26 could be provided and attached to the rear housing portion 25 to allow mounting of the controller 20 to a surface (e.g., on a wall of a building, at a location near a pool/spa equipment pad, etc.). A transformer 27 provides electrical power to a printed circuit board 33 containing circuitry of the controller 20, as well as to the chlorinator 10. The transformer 27 steps incoming power at a household voltage level (e.g. 120 volts) to a lower voltage level for use by the controller 20 and the chlorinator 10. Two bridge rectifiers 28 convert alternating current (AC) provided by the transformer 27 to direct current (DC) for use by the controller 20 and chlorinator 10. The transformer 27, rectifiers 28, and printed circuit board 33 are housed by the housing portions 22 and 25. The housing portions 22 and 25 could be secured together by way of screws (as shown in FIG. 3), snap fit, fasteners, adhesive, etc. A power cord 31 (which can be plugged into a household AC outlet) provides power to the transformer 27. Both the cable 30 and the power cord 31 could be secured to the housing using a clamp 32 and associated fasteners. The cover 24 can be rotated downward (i.e., away from the housing portion 22) so as to provide access to a control panel 40. As discussed in greater detail below in connection with FIGS. 4-5, the control panel 40 includes lights (e.g., light-emitting diodes (LEDs) or incandescent lights) which indicate various operational, status, and diagnostic information relating to the chlorinator 10 and the cell 60, as well as buttons and/or a control knob for allowing a user to control operation of the chlorinator 10. It is noted that the housing portions 22, 25 could be made from plastic or other suitable material. A rear plate 29 is attached to the rear housing portion 25.

Figure 4:
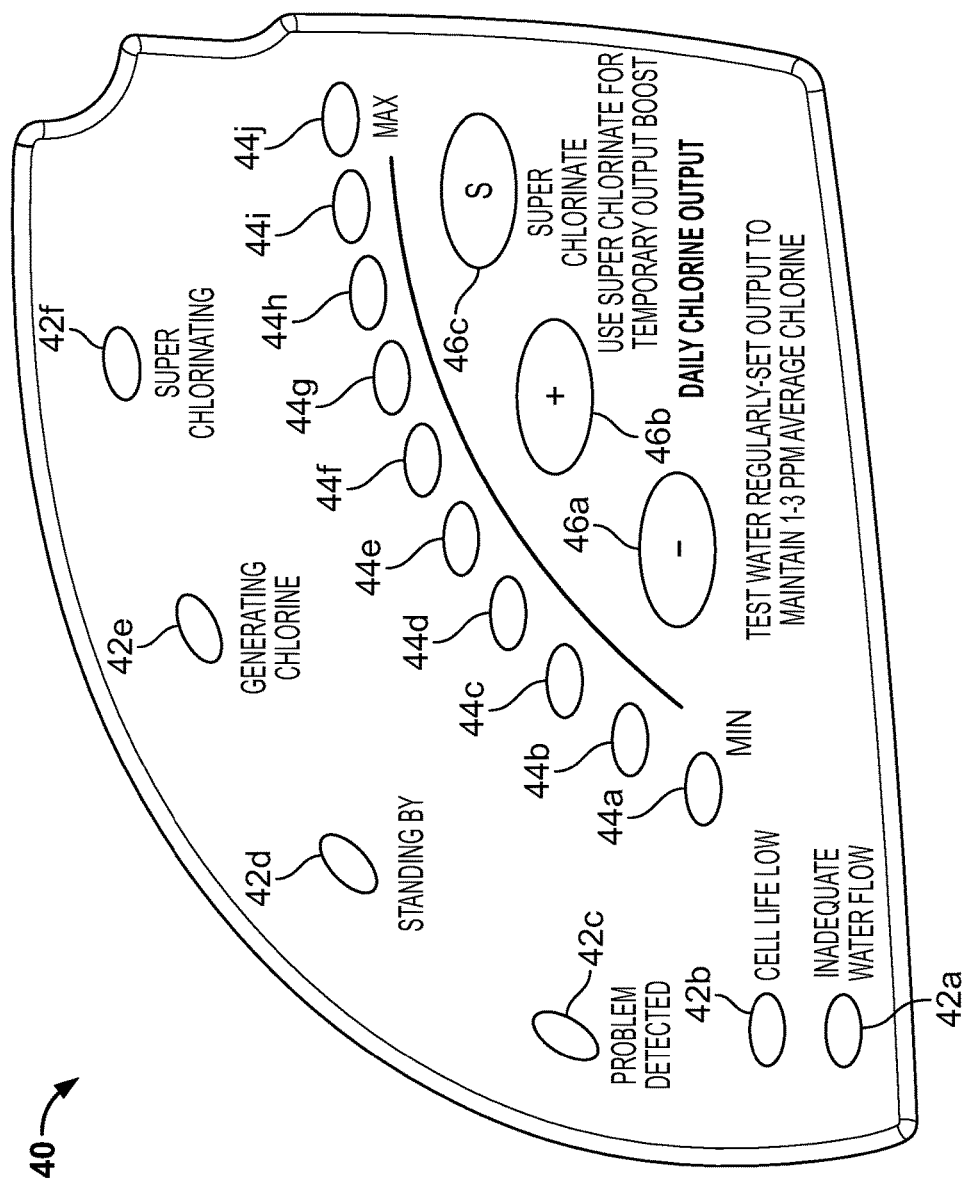
FIGS. 4-5 are partial front views of an exemplary embodiment of a controller of the present disclosure, showing a control panel of the controller in greater detail.

FIG. 4 is a diagram showing one embodiment of the control panel 40 of the controller 20. The panel 40 includes a plurality of status lights (e.g., LEDs) 42a-42f which indicate various conditions of the chlorinator 10, such as inadequate water flow through the chlorinator (light 42a), low cell life left (light 42b), a problem with the chlorinator and/or controller (light 42c), stand by state (light 42d), chlorine generation state (light 42e), and super chlorination state (light 42f). The plurality of status lights 42a-42f may alternatively be a single or a plurality of LCD screens or other display technology that is known. The inadequate water flow light 42a is illuminated when the controller 20 detects (via a flow sensor within the chlorinator 10) that inadequate or no water is flowing through the chlorinator 10. In such circumstances, the controller 20 halts operation of the chlorinator 10, thereby preventing damage to the chlorinator 10 and/or other components of a pool/spa system. The cell life low light 42b is illuminated when the controller 20 detects that the chlorinator cell 60 is approaching or is at the end of its useful life, thereby indicating that the cell should be replaced. The problem detected light 42c is illuminated when the controller 10 detects a malfunction/fault of the cell 60 and/or other components of the system. The standing by light 42d indicates that the chlorinator 10 is not operating but is in normal condition. The generating chlorine light 42e is illuminated by the controller 20 when the chlorinator 10 is generating chlorine. The super chlorinating light 42f is illuminated when the chlorinator is generating elevated levels of chlorine for a short period of time (e.g., to quickly boost the level of chlorine in a pool or spa).

The panel 40 also includes a plurality of lights 44a-44j which indicate chlorine output levels of the chlorinator 10 for a specified time period (e.g., daily). Each of the lights 44a-44j can represent a percentage of chlorine output from the chlorinator relative to a maximum chlorine output. As a non-limiting example, in the present embodiment, each of the lights 44a-44j can represent a ten percent (10%) increment in chlorine output (e.g., if lights 44a and 44b are illuminated the chlorine output is set to twenty percent and if the lights 44a-44e are illuminated the chlorine output is set to fifty percent). A plurality of membrane switches 46a-46c are provided for controlling the chlorine output level—by pressing the switch 46a, the user can decrease the level of chlorine generated by the chlorinator 10 (causing fewer of the lights 44a-44j to illuminate). Conversely, by pressing the switch 46b, the user can increase the level of chlorine generated by the chlorinator 10 (causing a greater number of the lights 44a-44j to illuminate). As described herein, a chlorine feed rate of the chlorinator 10 and/or a pump operation time of the pump 6 can be programmatically adjusted in response an increase or decrease in the chlorine output setting. Likewise, as described herein, a chlorine output can be adjusted programmatically in response to an increase or decrease in the chlorine feed rate of the chlorinator 10 and/or the pump operation time of the pump 6. By pressing the switch 46c, the user can initiate super chlorination mode, which causes the chlorinator 10 to generate an increased level of chlorine for a pre-defined period of time (also causing the light 42f to illuminate during this time period). It is noted that the lights 42a-42f and 44a-44j could be different colors, and that they could flash to indicate different parameters or conditions to the user (e.g., a certain flashing sequence could be initiated to indicate a problem with a particular component). In some embodiments, the control panel can include display (or lights) that display the pump operation time setting of the pump.

Figure 5:
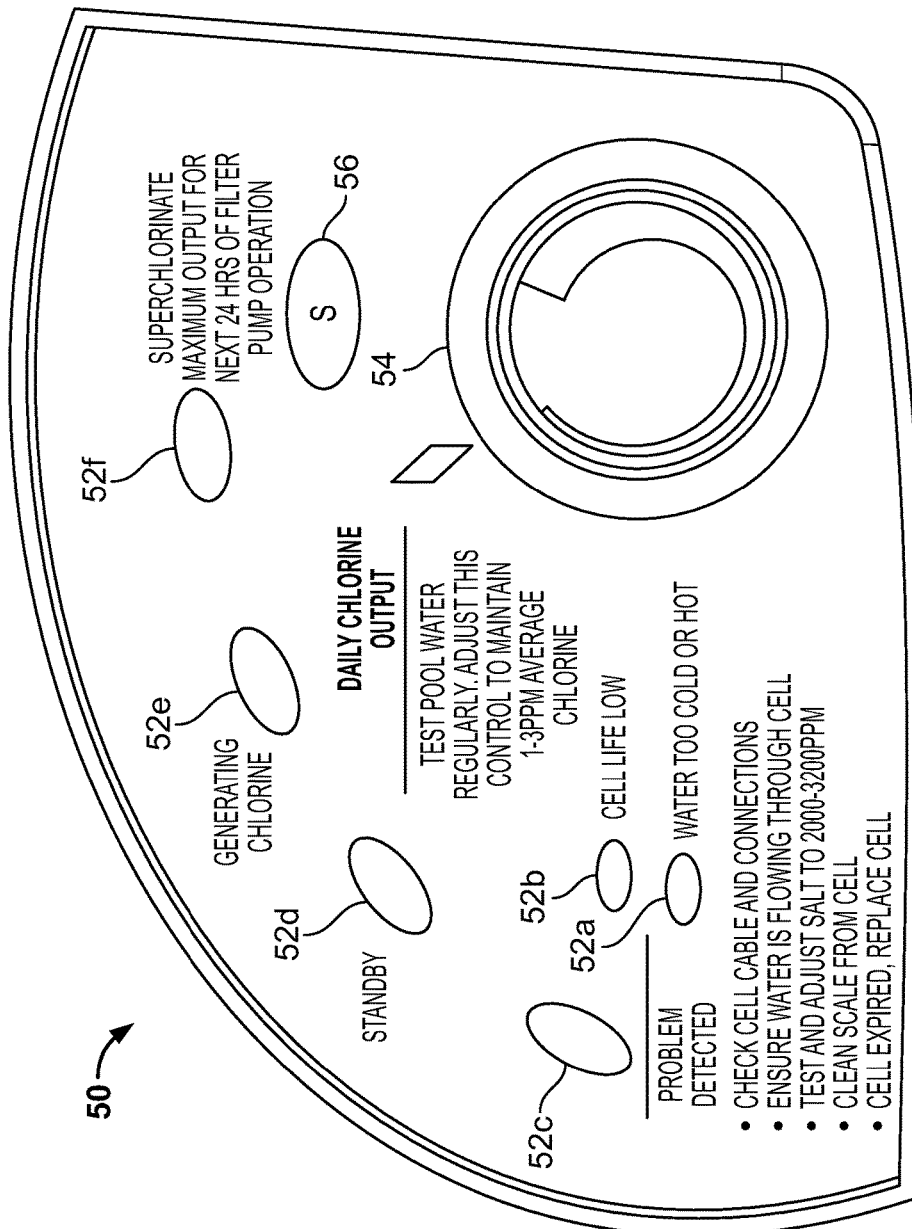

FIG. 5 is a partial front view of another embodiment of the control panel (indicated at 50) according to the present disclosure. In this embodiment, the control panel includes status lights (e.g., LEDs) 52a-52f as well as a control knob 54 and a button 56. The light 52a indicates whether sensed water temperature is too hot or too cold for chlorination. The light 52b indicates whether the usable remaining time (life) of the cell cartridge 60 is low. The light 52c indicates whether a problem has been detected with the cell cartridge 60 or another component. The light 52d indicates whether the system is in a standby condition (i.e., operating normally, but not currently generating chlorine). The light 52e indicates whether the chlorinator 10 is generating chlorine. The light 52f indicates whether the chlorinator 10 is in super chlorination mode. As with the embodiment shown in FIG. 4, the lights 52a-52f could be different colors, and could flash to indicate conditions/malfunctions to the user. The knob 54 can be rotated to increase or decrease chlorine output of the chlorinator 10 and the chlorinator 10 and/or the pump 6 can be programmatically controlled to adjust to the increase or decrease in the chlorine output as described herein. The button 56, when depressed, causes the chlorinator 10 to temporarily output an elevated level of chlorine (super chlorination).

Figure 6:
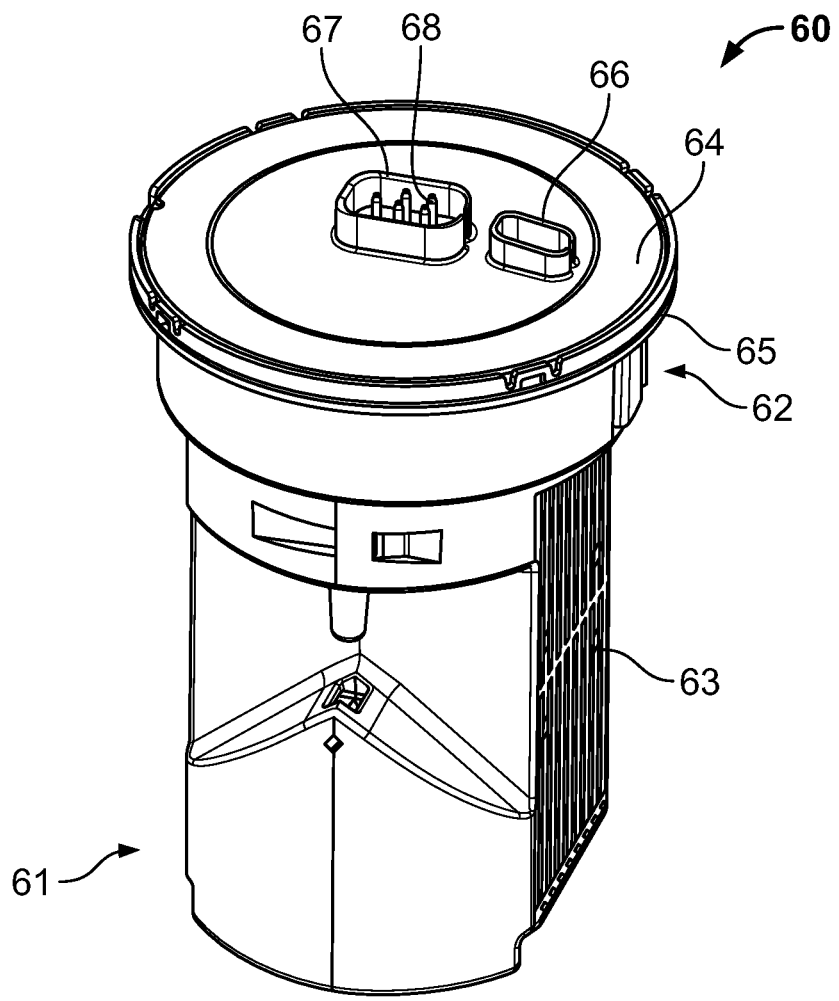
FIG. 6 is perspective view of the replaceable cell cartridge of the present disclosure.

FIG. 6 is perspective view of the replaceable cell cartridge 60 of the present disclosure. The cartridge 60 can be installed by a user into the chlorinator 10, and replaced as necessary. The cartridge 60 includes a cartridge body 61, a cartridge cap 62, a plurality of slots 63 aligned with a plurality of electrically-charged plates (blades) positioned within the cartridge 60, a cover 64 and an O-ring 65. The cover 64 includes a locking key 66 and an electrical connector 67 having a plurality of connector pins 68. The electrical connector 67 is shaped so that it is compatible with the shape of a plug (not shown) formed in the cap 16, so that only compatible cartridges can be used with the chlorinator 10. The plurality of connector pins 68 extend through the cover 64 and are in electrical connection with the electrical components of the cartridge 60. As discussed in greater detail below in connection with FIG. 8, the cartridge 60 includes an on-board processor and associated non-volatile memory for storing parameters relating to the cartridge 60, as well as sensors for sensing various conditions relating to water being chlorinated. The on-board processor also includes firmware for authenticating the cartridge 60 with the controller 10, so that only authorized cartridges are operable with the controller 10. When the cartridge 60 is inserted into the chlorinator 10, the O-ring 65 creates a seal between the cartridge 60 and the chlorinator 10 so that no water escapes from the chlorinator 10. The O-ring 65 may alternatively be a flat gasket or other sealing agent, or replaced by any other known sealing methodology. The cartridge 60 can be removed from the chlorinator 10 as necessary by a user and replaced.

Figure 7:
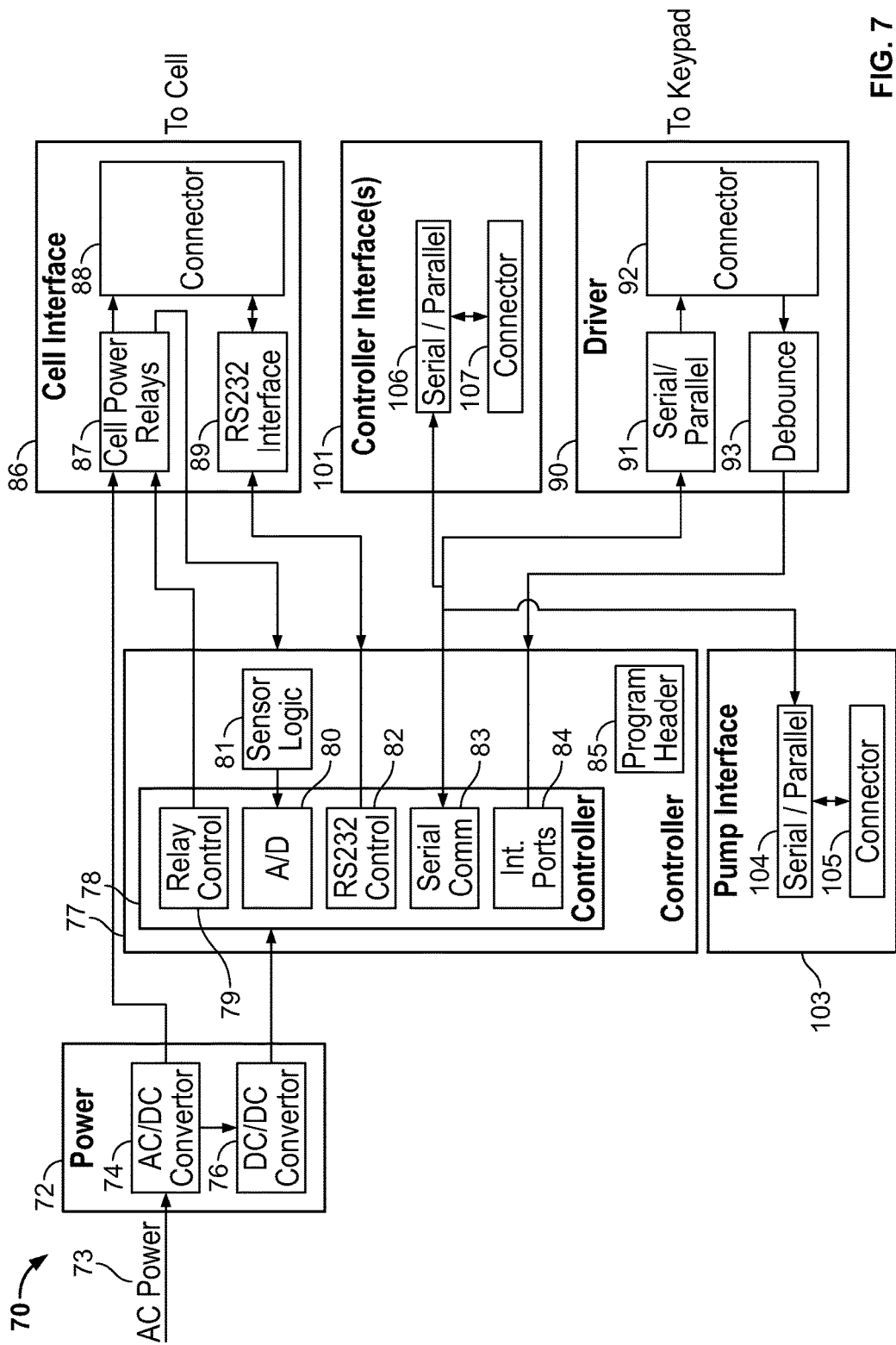
FIG. 7 is a schematic diagram illustrating electrical and software components of the controller of the present disclosure.

FIG. 7 is a schematic diagram, indicated generally at 70, illustrating electrical and software components of the controller 20 of the present disclosure. The controller 20 includes a power supply 72, a controller subsystem 77, a cell (cartridge) interface 86, driver subsystem 90, controller interface(s) 101, and a pump interface 103. The power supply 72 provides power to the controller subsystem 77, the cell interface 86, and the driver subsystem 90, as well as power to the chlorinator 10. The power supply 72 includes an alternating current (AC) to direct current (DC) converter 74 which coverts household AC power 73 (supplied by the power cable 31 shown in FIG. 3) to DC power, and a DC to DC converter 76 which converts DC output of the converter 74 to direct current of a different voltage level for subsequent use by the control subsystem 77.

The control subsystem 77 includes a controller integrated circuit (IC) 78 having a number of functional components including relay control logic 79, an analog-to-digital (A/D) converter 80, a serial (RS-232) communications controller 82, a serial communications module 83, and interrupt ports 84. The controller IC 78 could be the PIC16F1938 microcontroller manufactured by MICROCHIP, INC., or any other suitable equivalent. The control subsystem 77 also includes non-volatile, computer-readable memory which stores the control processes disclosed herein in the form of computer-readable instructions capable of being executed by the controller IC 78. Such instructions could be accessed from the memory by way of a software program header 85. The memory could be separate from the controller IC 78 (i.e., on another IC chip) or it could be provided on the controller IC 78. The control subsystem 77 also includes sensor logic 81 for determining the state of one or more power relays of the cell interface 86.

The driver subsystem 90 permits communication between the buttons of the control panel (keypad) 40 or 50, and includes a serial-to-parallel converter 91, a debounce circuit 93, and a connector 92 for connection with the control panel 40 or 50. The driver 90 receives control commands entered by a user at the control panel 40 or 50, processes same, and transmits the commands to the controller subsystem 77 for execution thereby. The control subsystem 77 also controls the various status lights of the control panel 40 or 50.

The cell interface 86 includes cell power relays 87, a connector 88, and a communications (RS-232) interface 89. The cell power relays 87 selectively control power delivered to the cell (cartridge) 60 of the chlorinator 10, and are controlled by the relay control logic 79 of the controller IC 78. The communications interface 89 permits bidirectional serial data communications between the controller subsystem 77 and the on-board processor of the cartridge 60. The connector 88 mates with the port 67 and has a shape that matches the port 67.

The controller interface(s) 101 permit communication between the controller subsystem 77 and the system controller 15 and includes a serial and/or parallel interface 104 and a connector 105 for connection with the controller 15. The controller subsystem 77 can receive from transmit data and/or instructions from the system controller 15, which can be used by the controller subsystem 77 to execute control processes described herein and/or can transmit data and/or commands to the controller 15 to control an operation of the system controller 15 and/or components operatively coupled to the controller 15 via control processes described herein.

The pump interface 105 permit communication between the controller subsystem 77 and the pump 6 (e.g., via the pump controller 8) and includes a serial and/or parallel interface 106 and a connector 107 for connection with the pump controller 8. The controller subsystem 77 can receive data and/or commands from the pump controller 8, which can be used by the controller subsystem 77 to execute control processes described herein and/or can transmit data and/or commands to the pump controller 8 to control an operation of the pump 6 via control processes described herein.

Figure 8:
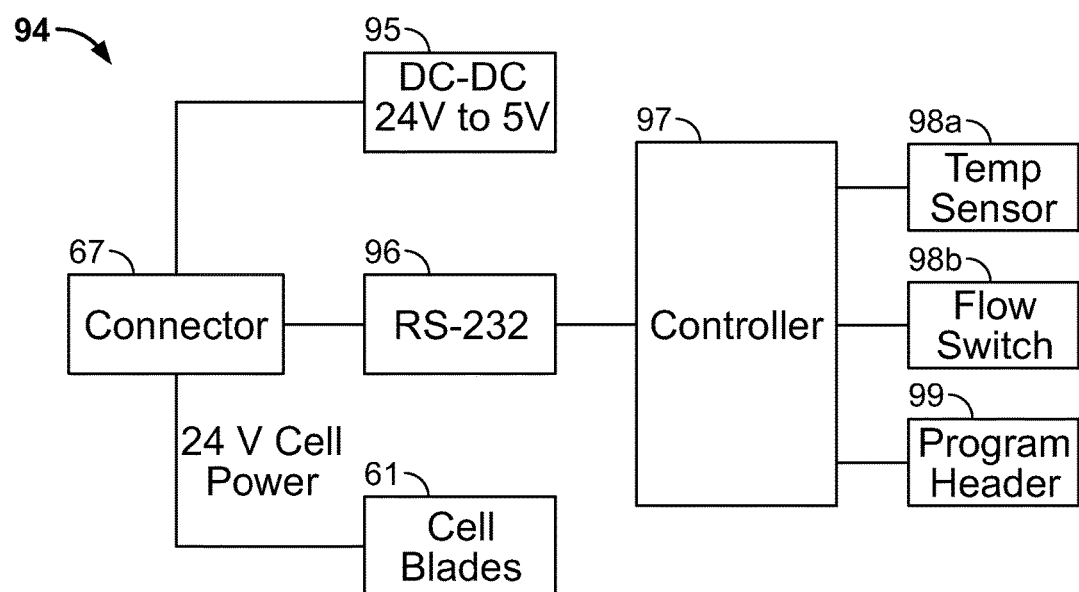
FIG. 8 is a schematic diagram illustrating electrical and software components of the cell cartridge of the present disclosure.

FIG. 8 is a schematic diagram, indicated generally at 94, illustrating electrical and software components of the cell (cartridge) 60 of the present disclosure. The connector 67 is in electrical communication with a DC-to-DC converter 95 which, for example, converts 24 volts DC current supplied to the cartridge 60 by the controller 20 to a lower voltage level of 5 volts. A communications transceiver (RS-232) 96 is provided in the cartridge 60 and permits bidirectional serial data communications between the cartridge 60 and the controller 20. The cartridge 60 also includes a controller IC 97 in communication with one or more sensors such as a temperature sensor 98a for measuring water temperature and/or a flow switch 98b for sensing water flow. The controller 97 obtains sensed parameters from the sensors 98a, 98b and, upon receiving a request from the controller 20, transmits the sensed parameters to the controller 20 using the communications transceiver 96. A non-volatile memory 100 (see FIG. 9) associated with, or forming part of, the controller IC 97 stores parameters associated with the cartridge 60 as well as an authentication/encryption key that can be used to authenticate the cartridge 60 with the controller 20 and/or allow for encrypted communications therebetween. Advantageously, authentication permits operation of only authorized cartridges with the controller 20. Control/program logic executed by the cartridge 60, in the form of computer-readable instructions, could be stored in the on-board non-volatile memory 100, and could be accessed by the controller IC 97 by way of a software program header 99. It is noted that other sensors could be provided on-board the cartridge 60, such as a pH sensor, an ORP sensor, and/or other sensors, and the controller IC 97 could be configured to obtain sensed levels from such sensors and transmit same to the controller 20. The on-board controller IC 97 could be the PIC16F1823 microcontroller manufactured by MICROCHIP, INC., or any other suitable equivalent.

Figure 9:
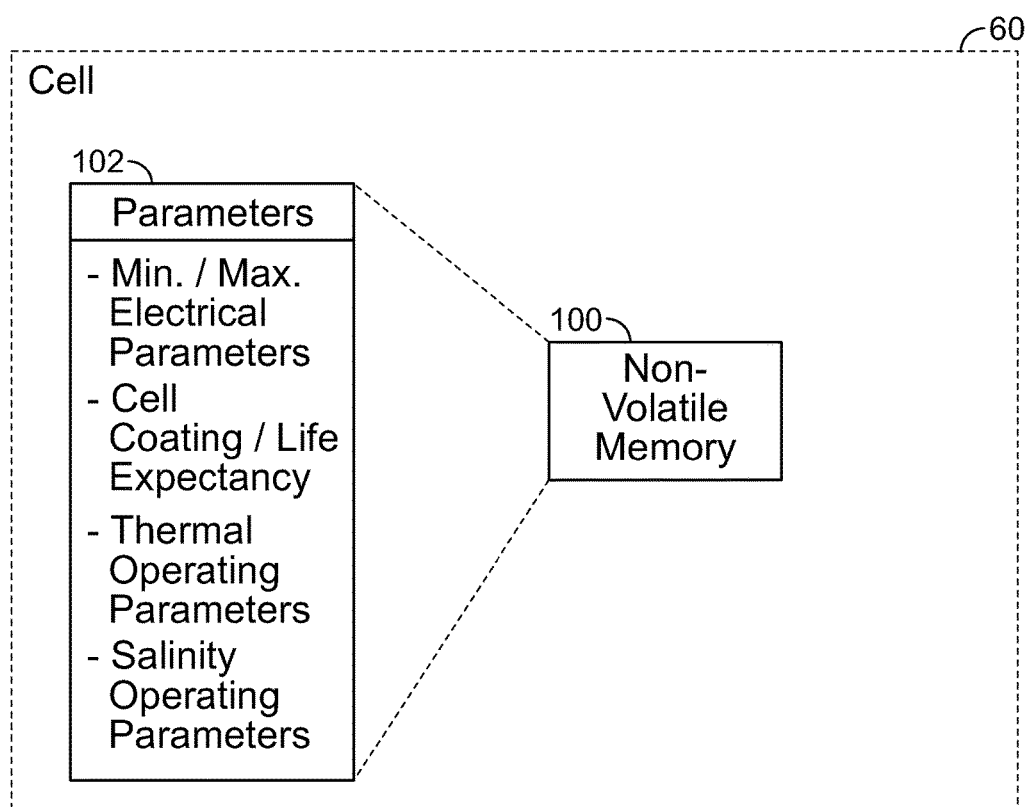
FIG. 9 is a diagram illustrating non-volatile memory of the cell cartridge of the present disclosure, and sample parameters capable of being stored in the non-volatile memory.

FIG. 9 is a diagram illustrating non-volatile memory 100 of the cell cartridge 60 of the present disclosure, and sample parameters 102 capable of being stored in the non-volatile memory 100. Parameters 102 which could be stored in the non-volatile memory 100 include, but are not limited to, minimum/maximum electrical parameters associated with the cartridge 60, cell coating and/or life expectancy (i.e., information relating to materials used to coat the plates/blades of the cell, as well as total expected operational lifetime of the cell), thermal operating parameters, salinity operating parameters, etc. The parameters 102 could be loaded into the memory 100 by a manufacturer of the cartridge 60, and/or they could be updated during use of the cartridge 60 (e.g., by the controller 20).

Figure 10:
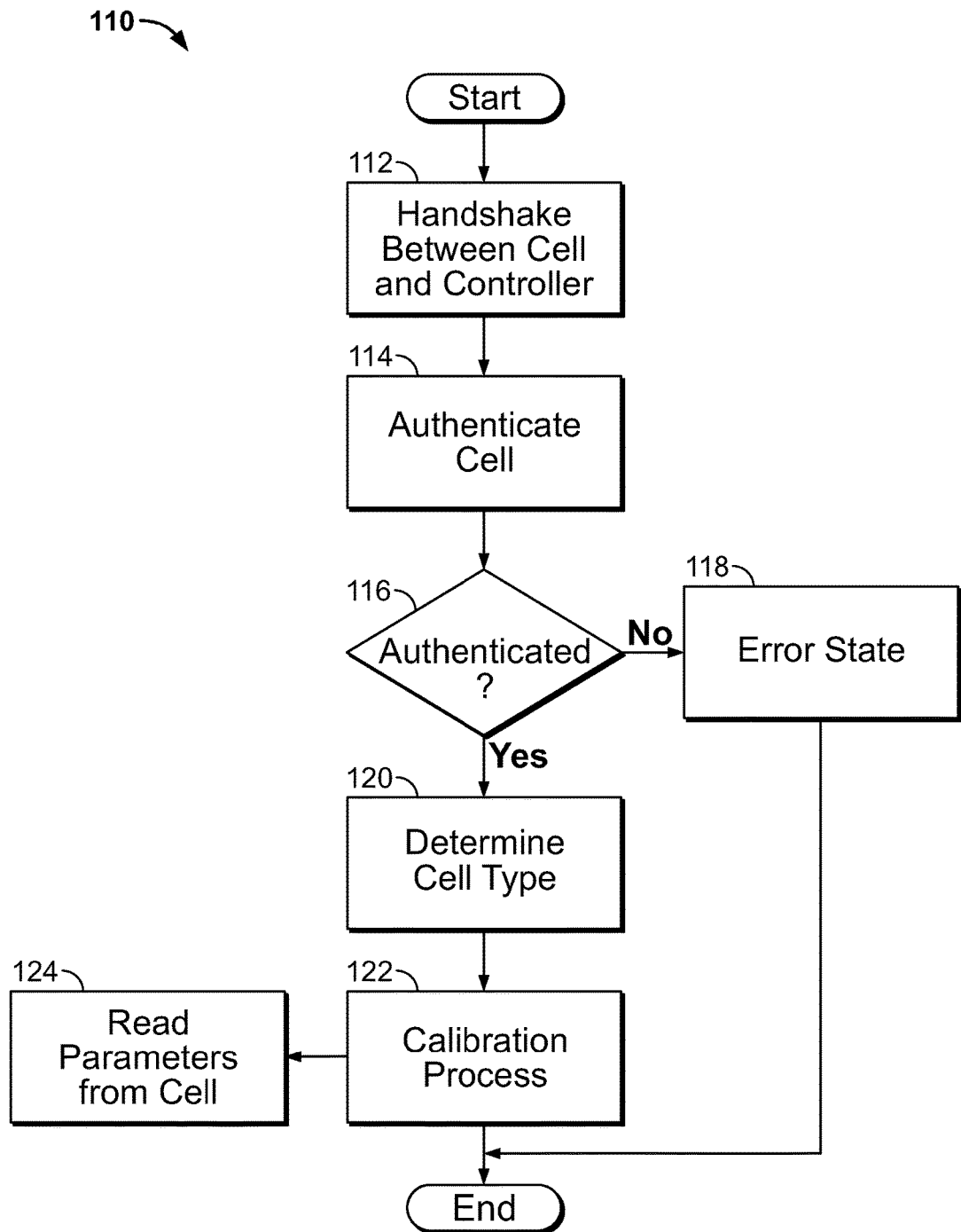
FIG. 10 is flowchart showing processing steps according to the present disclosure for communication with the cell cartridge by the controller, as well as authentication of the cell cartridge and calibration of the cell.

FIG. 10 is flowchart showing processing steps of control processes according to the present disclosure, indicated generally at 110, for communication with the cell cartridge 60 by the controller 20, as well as authentication of the cell cartridge 60 and calibration of the cell 60. Beginning in step 112, a communications "handshake" is exchanged between the cell 60 and the controller 20, to establish a communications link between the two components. In step 114, the cell 60 transmits an authentication key to the controller 20. Any suitable authentication technique could be used, such as the AES encryption standard or any other suitable equivalent. The transmitted authentication key is processed by the controller 20, and a determination is made in step 116 as to whether the cell 60 is authenticated. If not, step 118 occurs, wherein the controller 20 enters an error state and operation of the cell 60 is not permitted. Otherwise, if the cell 60 is authenticated, step 120 occurs, wherein the controller 20 determines the type of the cell 60. For example, by communicating with the cell 60, the controller could determine whether the cell 60 is an extended-life cell or a cell having a reduced lifetime. In step 122, once the cell type has been determined, the controller 20 executes a calibration process for calibrating operation of the cell 60. To do so, in step 124, the controller 20 reads one or more parameters from the cell 60. It is noted that the cell 60 could be authenticated upon the first communication between the controller 20 and the cell 60 after system power-up, periodically, or every time a communication occurs between the controller 20 and the cell 60.

Figure 11:
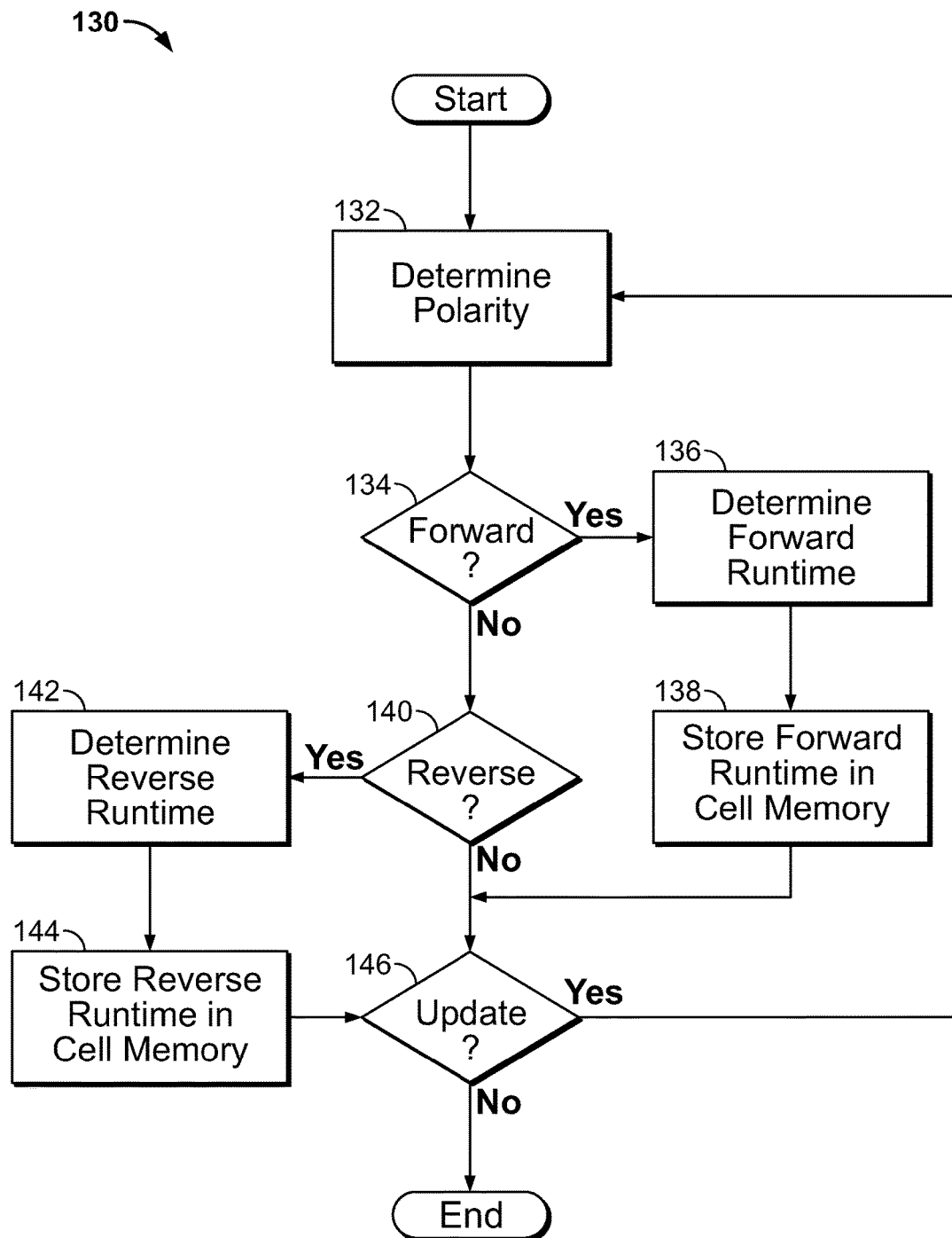
FIG. 11 is a flowchart showing processing steps according to the present disclosure for storing information in non-volatile memory of the cell cartridge relating to run times.

FIG. 11 is a flowchart showing processing steps of control processes, indicated generally at 130, according to the present disclosure for storing information in non-volatile memory 100 of the cell cartridge 60 relating to run times, i.e., the amount of time that the cell 60 has been operated. In step 132, the controller IC 97 of the cell 60 determines the polarity being applied to the cell 60. In step 134, a determination is made as to whether the polarity applied to the cell 60 is forward polarity. If so, steps 136 and 138 occur, wherein the controller IC 97 determines the forward run time and stores the forward run time in the non-volatile memory 100 of the cell 60. Otherwise, step 140 occurs, wherein the controller 97 determines whether the polarity applied to the cell 60 is reverse polarity. If so, steps 142 and 144 occur, wherein the controller IC 97 determines the reverse run time and stores the reverse run time in the non-volatile memory 100 of the cell 60. In step 146, a determination is made as to whether to update the run time information for the cell 60. If so, control returns to step 132; otherwise, processing ends. By storing forward and reverse run time information in the non-volatile memory 100 of the cell 60, it is possible to track the total amount of time that the cell 60 has been in operation (i.e., by adding the forward and reverse run times), as well as the number of times polarity has been reversed. This information is useful for identifying the total amount of life left in the cell 60, as well as for other diagnostic purposes.

Figure 12:
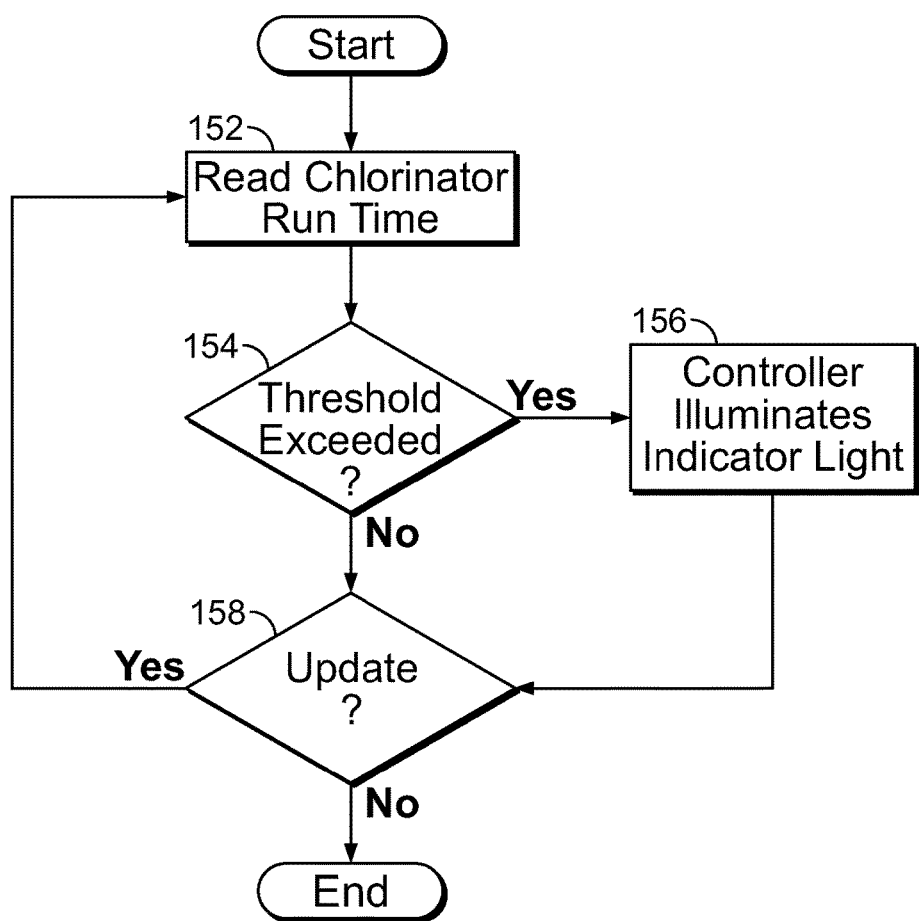
FIG. 12 is a flowchart showing processing steps according to the present disclosure for reading run time information from non-volatile memory of the cell cartridge, determining whether the run time exceeds a threshold, and indicating same to a user.

FIG. 12 is a flowchart showing processing steps of control processes according to the present disclosure, indicated generally at 150, for reading run time information from non-volatile memory 100 of the cell cartridge 60, determining whether the run time exceeds a threshold, and indicating same to a user. In step 152, run times (both forward and reverse run time) are read from the non-volatile memory 100 of the cell 60, and total run time is calculated. Then, in step 154, a determination is made as to whether the total run time exceeds a pre-defined threshold. If so, step 156 occurs, wherein the controller 20 illuminates an indicator light on the panel 40, i.e., the cell life low lights 42b or 52d shown in FIGS. 4-5. The illuminated light indicates to the user that the cell 60 should be replaced with a new cell. Otherwise, step 158 occurs, wherein a determination is made as to whether to update the run time information. If so, control returns to step 152; otherwise, processing ends.

Figure 13:
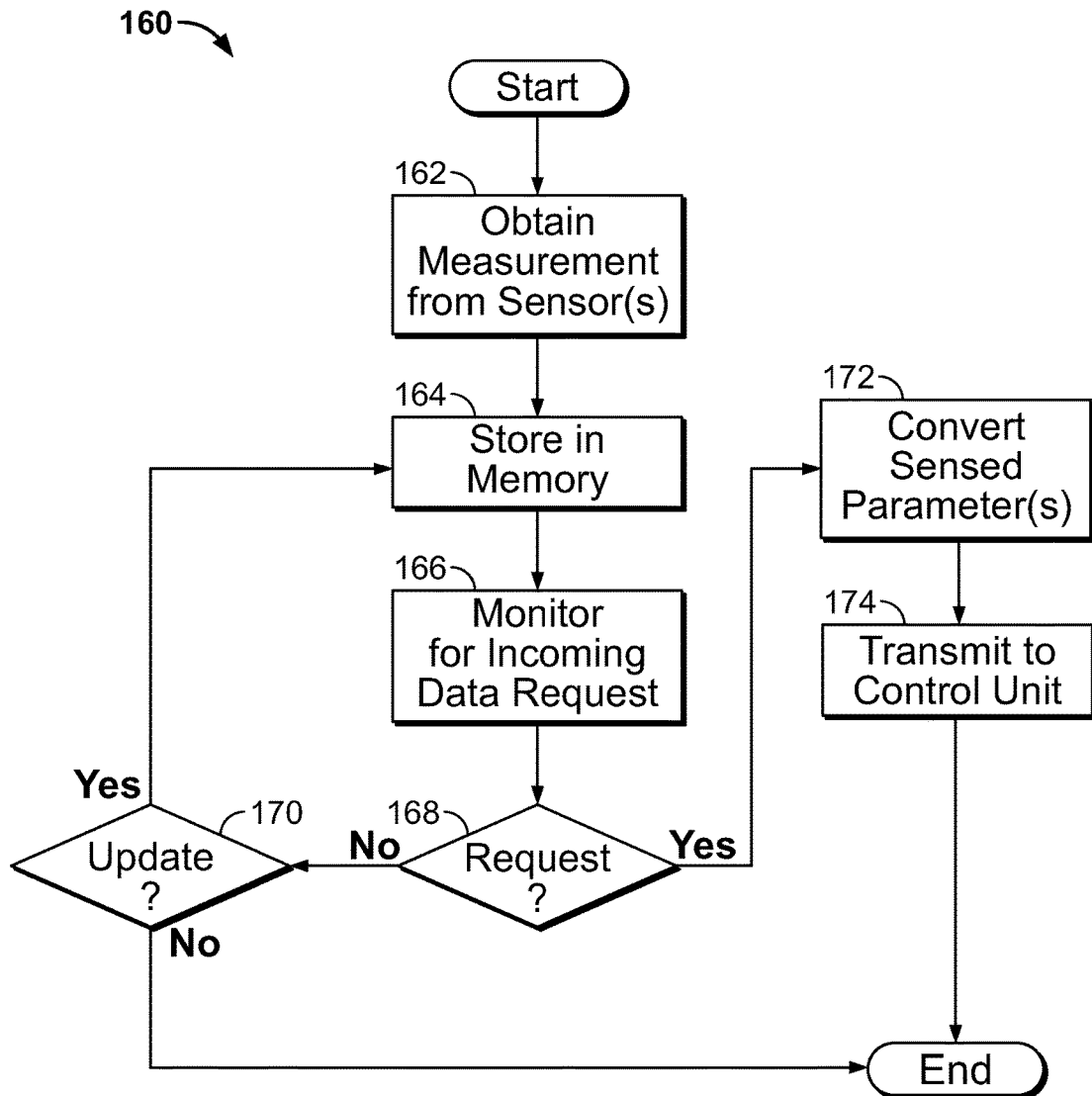
FIG. 13 is a flowchart showing processing steps according to the present disclosure for storing sensed information in memory of the cell cartridge and transmitting such information to the controller.

FIG. 13 is a flowchart showing processing steps of control processes according to the present disclosure, indicated generally at 160, for storing sensed information in memory 100 of the cell cartridge 60 and transmitting such information to the controller 20. In step 162, the controller IC 97 of the cell 60 obtains measurements from one or more of the sensors 98a, 98b, including, but not limited to, temperature, flow rate, pH, ORP, etc. Then, in step 164, the controller IC 97 stores the obtained measurements in the non-volatile memory 100. In step 166, the controller IC 97 monitors for an incoming request for data, i.e., a request generated by the controller 20 and transmitted to the cell 60. Then, in step 168, a determination is made as to whether a request has been received. If so, steps 172 and 174 occur, wherein the sensed measurements (parameters) stored in the non-volatile memory 100 are converted into communications protocol format and the converted information is transmitted from the cell 60 to the control unit 20 via the cable 30 or wirelessly. Otherwise, step 170 occurs, wherein a determination is made as to whether to update the measurements/parameters. If so, control returns back to step 162; otherwise, processing ends. It is noted that a wide variety of measurements/parameters could be obtained and stored in non-volatile memory 100 of the cell 60, including, but not limited to, chlorine parts per million (ppm), ORP, pH, salt ppm, turbidity, calcium hardness, and other parameters, and such parameters could be transmitted to the controller 20 for processing thereby.

Figure 14:
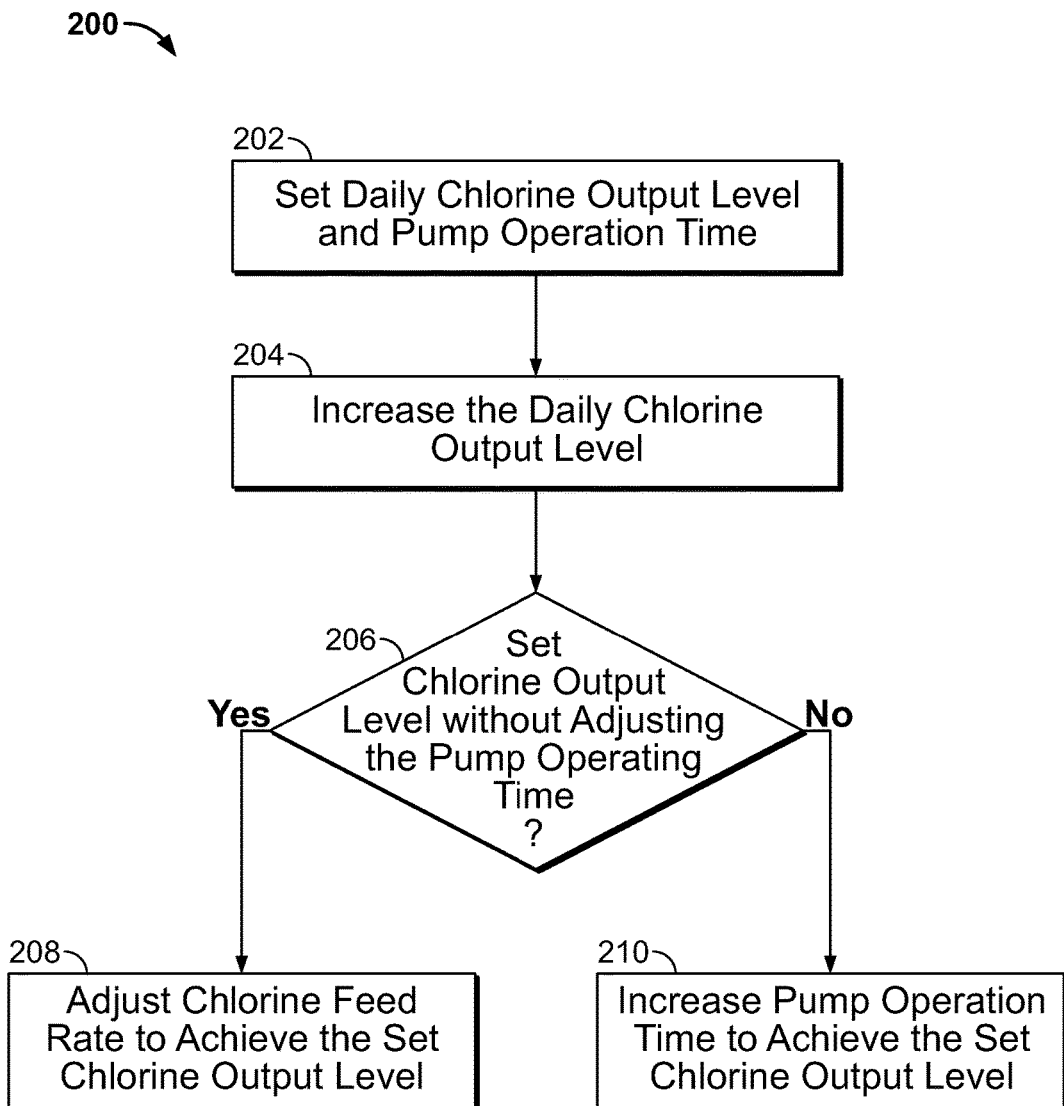
FIG. 14 is a flowchart showing processing steps of control processes according to the present disclosure for controlling an operation of a pump in response to an increase in the chlorine output setting.

FIG. 14 is a flowchart showing processing steps of control processes according to the present disclosure, indicated generally at 200, for controlling an operation of a pump in response to an increase in the daily chlorine output setting. At step 202, the chlorinator 10 can be set to a specified daily chlorine output level and the pump operation time can be set to a specified time period so that the pump 6 operates a specified amount of time each day. At step 204, a user can interface with the control panel 40 to increase the daily chlorine output level. At step 206, the controller determines whether the chlorinator 10 can generate the set chlorine output level without adjusting the pump operating time. If so, the controller 20 adjusts the chlorine feed rate of the chlorinator 10 to achieve the set chlorine output level at step 208, while retaining the pump operation time as unchanged. In some embodiments, the controller can interface with the control panel to request permission from the user before adjusting the chlorine feed rate of the chlorinator. If permission is not granted by the user, the chlorine output setting and the chlorine feed rate do not change. If the pump operation time setting needs to be adjusted, the controller can increase the pump operation time at step 210 to achieve the set chlorine output level. In some embodiments, the controller can request permission from the user before adjusting the pump operation time setting. If permission is not granted by the user, the pump operation time is not changed. In some embodiments, the controller can also increase the chlorine feed rate in addition to increasing the pump operation time in response to a determination that the chlorinator 10 cannot achieve the set chlorine output level without increasing the pump operation time.

Figure 15:
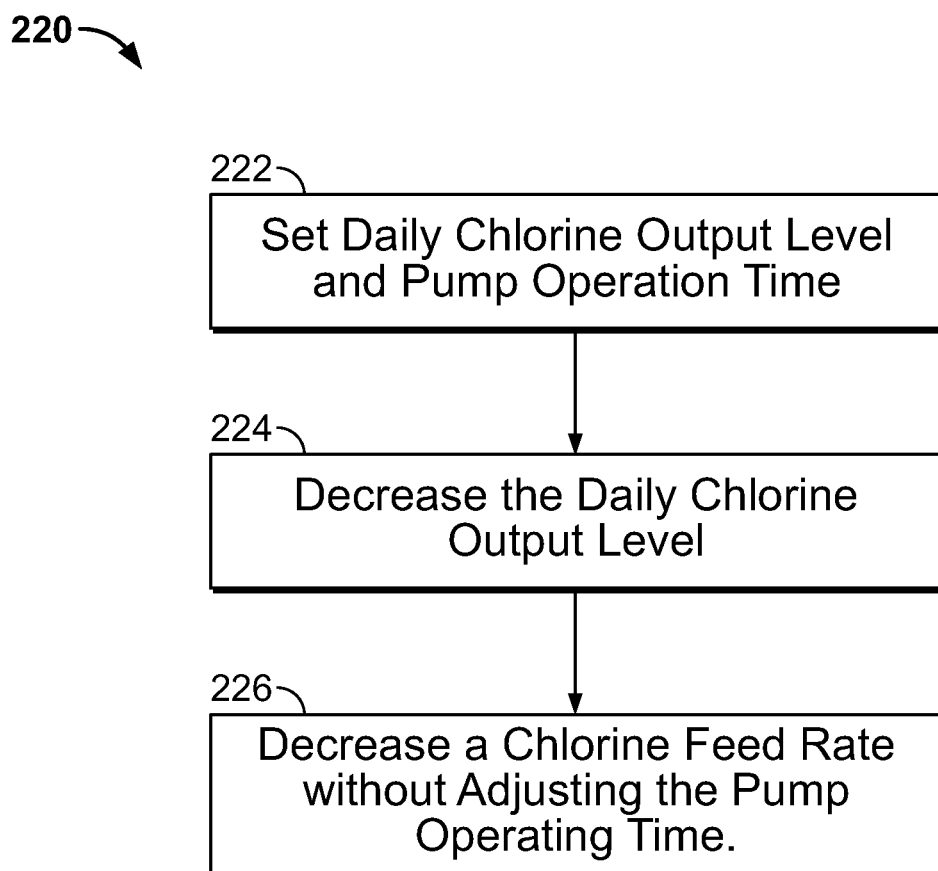
FIG. 15 is a flowchart showing processing steps of control processes according to the present disclosure for controlling an operation of a chlorinator in response to a decrease in the chlorine output setting.

FIG. 15 is a flowchart showing processing steps of control processes according to the present disclosure, indicated generally at 220, for controlling an operation of a chlorinator 10 in response to a decrease in the daily chlorine output setting. At step 222, the chlorinator 10 can be set to a specified daily chlorine output level and the pump operation time can be set to a specified time period so that the pump 6 operates a specified amount of time each day. At step 224, a user can interface with the control panel 40 to decrease the daily chlorine output setting. At step 206, the controller can decrease a chlorine feed rate of the chlorinator 10 without adjusting the pump operating time to achieve the daily chlorine output setting. In some embodiments, the controller can interface with the control panel to request permission from the user before adjusting the chlorine feed rate of the chlorinator. If permission is not granted by the user, the chlorine output setting and the chlorine feed rate do not change.

While an exemplary embodiment of the present disclosure has been describe in which a controller programmatically adjusts the chlorine feed rate or the pump operation time setting in FIGS. 14-15, those skilled in the art will recognize that in exemplary embodiments, the controller can be programmed to indicate, for example, via the control panel, that the one or more settings must be adjusted to achieve a specified chlorine output level and the user can adjusted the identified settings manually. For example, the user can be instructed to manually adjust (e.g., increase or decrease) a chlorine feed rate and/or a pump operation time setting to achieve a chlorine output setting that has been requested by the user.

As a non-limiting example of the processing steps of FIGS. 14 and 15 and using exemplary values for the chlorine output setting, the chlorine feed rate, and the pump operation time, the chlorinator 10 can be initially set to a daily chlorine output of forty percent (40%), a feed rate of eighty percent (80%) (based on a three hour operation cycle), and a daily pump operation time of twelve hours (12 hrs). A user can increase the chlorine output setting to fifty percent (50%), and the controller 20 can be programmed to respond by increasing the chlorine feed rate to one-hundred percent (100%), while the pump operation time remains unchanged. Subsequently, the user can increase the chlorine output setting to sixty percent (60%). Since the chlorine feed rate is at one hundred percent (100%), the controller 20 can be programmed to increase in the pump operation time to fourteen and four tenths hours (14.4 hrs) to ensure that the chlorine output setting is achieved (24 hr*60/100*100/100=14.4 hrs). At some time later, the user can decrease the chlorine output setting from sixty percent (60%) to fifty percent (50%), and the controller 20 can be programmed to decrease the chlorine feed rate to eight three percent (83%), while maintaining the pump operation time at fourteen and four tenths hours (14.4 hrs). To determine the value of the current feed rate, the controller can determine a pump operation time that would satisfy the chlorine output setting of fifty percent if the chlorine feed rate was set to one hundred percent (e.g., twelve hours) and can determine a percent difference between this pump operation time and the current pump operation time ([12 hrs/14.4 hrs]*100=~83%).

Figure 16:
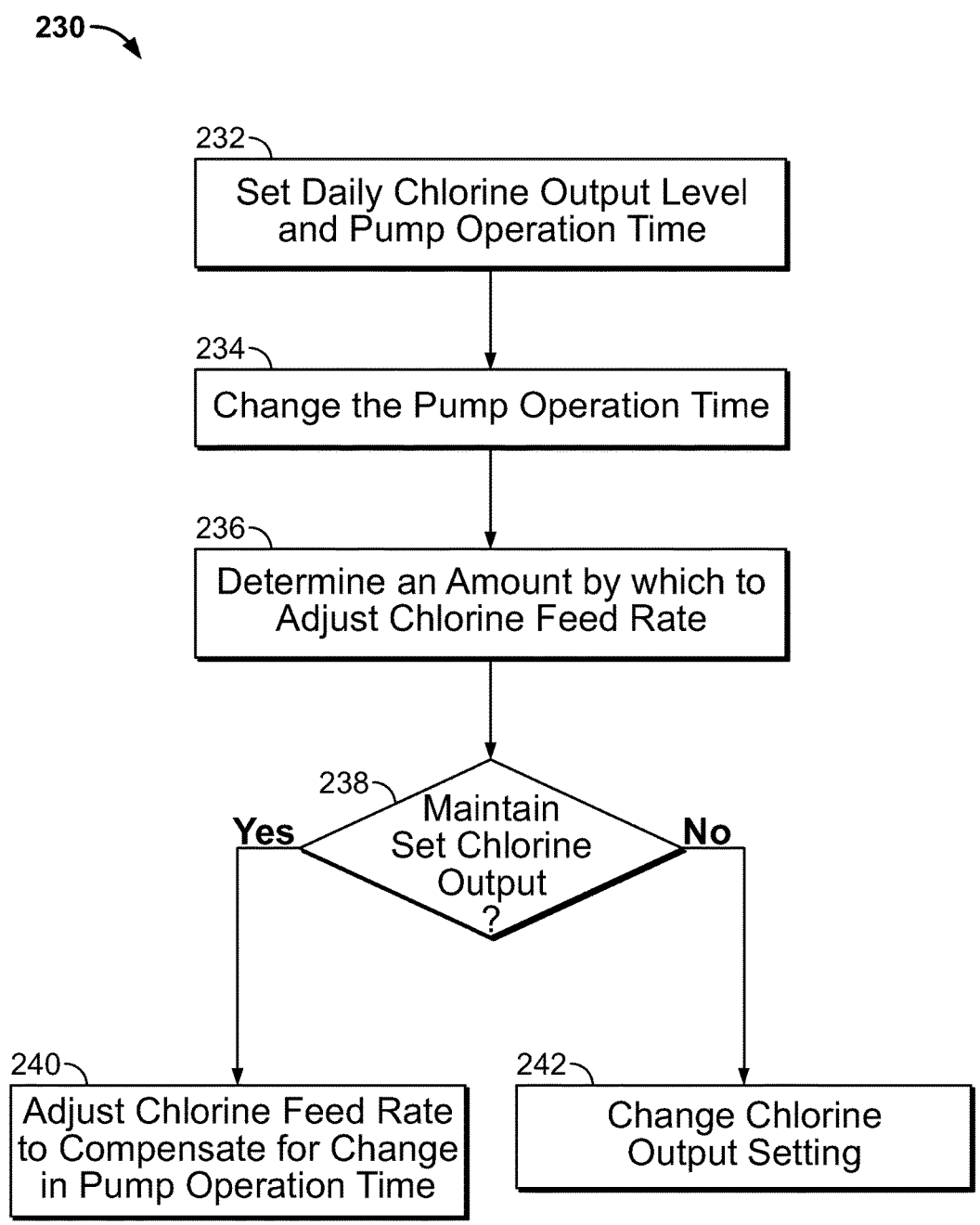
FIG. 16 is a flowchart showing processing steps of control processes according to the present disclosure for controlling an operation of a chlorinator in response to a change in the pump operation time.

FIG. 16 is a flowchart showing processing steps of control processes according to the present disclosure, indicated generally at 230, for controlling an operation of a chlorinator in response to a change in the pump operation time. At step 232, the chlorinator 10 can be set to a specified daily chlorine output level and the pump operation time can be set to a specified time period so that the pump 6 operates a specified amount of time each day. At step 234, a user can interface with the pump to change the pump operation time. At step 236, the controller determine an amount by which the chlorine feed rate of the chlorinator 10 is to be adjusted to maintain a set chlorine output level and compensate for the change in the pump operation time in response to an increase.

In exemplary embodiments, the relationship between the pump operation time and the chlorine feed rate can be inversely proportional to maintain a set chlorine output level. As one non-limiting example, if the pump operation time is decreased, the controller can attempt increase the chlorine feed rate to maintain the set chlorine output level and compensate for the reduce time period over which the pump circulates the water. As another non-limiting example, if the pump operation time is increased, the controller can decrease the chlorine feed rate to maintain the set chlorine output level and compensate for the reduce time period over which the pump circulates the water.

At step 238, the controller determines whether the chlorinator can maintain a set chlorine output in response to the change in the pump operation time. If so, the controller adjusts the chlorine feed rate at step 240 based on the determined amount to compensate for the change in the pump operation time and to ensure that the chlorine output by the chlorinator corresponds to the chlorine output setting displayed by the control panel 40. In some embodiments, the controller can interface with the control panel to request permission from the user before adjusting the chlorine feed rate of the chlorinator. If permission is not granted by the user, the chlorine output setting and the chlorine feed rate do not change. If the chlorinator can maintain a set chlorine output in response to the change in the pump operation time, the controller changes the chlorine output setting displayed by the control panel 40 at step 242 to indicate the chlorine output level being realized by the chlorinator 10 because the chlorinator 10 was unable to maintain the previously set chlorine output level. In some embodiments, the controller can interface with the control panel to request permission from the user before adjusting the chlorine output setting of the chlorinator.

While an exemplary embodiment of the present disclosure has been describe in which a controller programmatically adjusts the chlorine feed rate or the pump operation time setting in FIG. 16, those skilled in the art will recognize that in exemplary embodiments, the controller can be programmed to indicate, for example, via the control panel, that the one or more settings must be adjusted to achieve a specified chlorine output level and the user can adjusted the identified settings manually. For example, the user can be instructed to manually adjust (e.g., increase or decrease) a chlorine feed rate and/or a pump operation time setting to achieve a chlorine output setting that has been requested by the user.

As a non-limiting example of the processing steps of FIG. 16 and using exemplary values for the chlorine output setting, the chlorine feed rate, and the pump operation time, the chlorinator 10 can be initially set to a daily chlorine output of fifty percent (50%), a feed rate of eighty three percent (83%) (based on a three hour operation cycle), and a daily pump operation time of twelve hours (14.4 hrs). A user can decrease the pump operation time to eight hours, which would require a chlorine feed rate of chlorinator to increase by approximately fifty five percent (55%). However, because the chlorine feed rate is currently set to eighty three percent (83%) and cannot exceed one hundred percent (100%), the controller is programmed to determine that the chlorine output setting of fifty percent (50%) cannot be maintained chlorine output setting to fifty percent (50%), and the controller 20 can be programmed to respond by decreasing to maximize the chlorine output for the given pump operation time, For example, the controller 20 can reduce the chlorine output setting to thirty percent (30%) and can increase the chlorine feed rate to ninety percent (90%) (24 hrs*30/100*100/90=8 hrs). Notably, if the controller 20 attempted to set the chlorine output to forty percent (40%), the chlorine feed rate would have to be set to one hundred twenty percent (120%), which is beyond the capability of the chlorinator in the present example.

Figure 17:
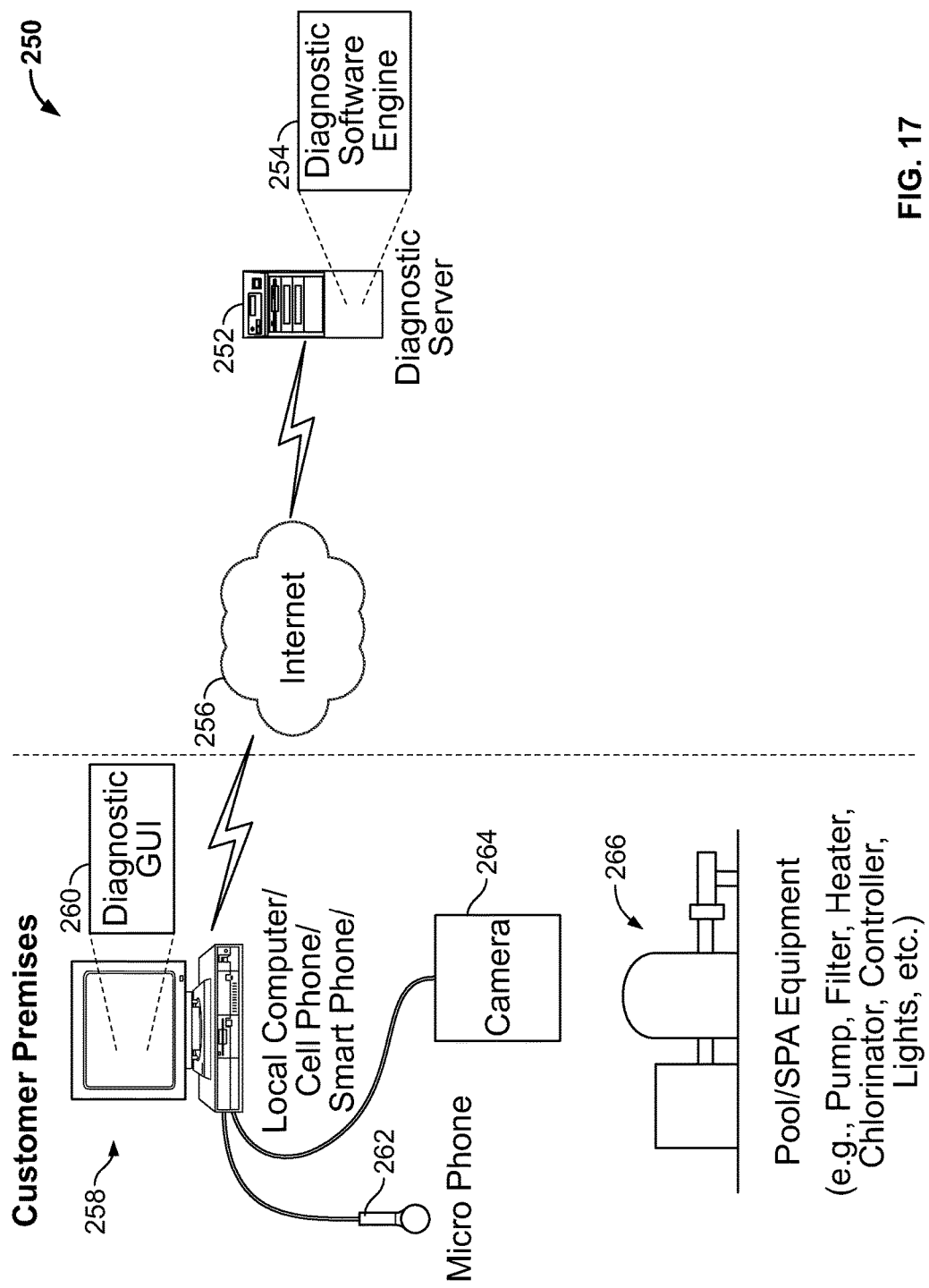
FIG. 17 is a diagram illustrating a system according to the present disclosure for remotely diagnosing errors and/or malfunctions associated with pool/spa equipment.

FIG. 17 is a diagram illustrating a system according to the present disclosure, indicated generally at 250, for remotely diagnosing errors and/or malfunctions associated with pool/spa equipment. The system 250 includes a diagnostic server 252 which executes a diagnostic software engine 254, in communication with a local application executing on a computer system 258. Communication could be by way of the Internet 256, a local area network (LAN), a wide area network (WAN), a cellular network, etc. The computer system 258 could be a personal computer, tablet computer, cellular phone, smart phone, etc., and the local application executed by the computer system 258 generates a diagnostic graphical user interface (GUI) display 260 that is displayed on a display of the computer system 258. The GUI 260 could replicate one or more control panels of the pool/spa equipment 266, e.g., the GUI 260 could appear identical to the control panels 40 or 50 shown in FIGS. 4-5. When a malfunction of the equipment 266 occurs, the user can replicate the appearance of indicator lights appearing on the control panel(s) of the equipment 266 using the GUI 260. For example, if the control panel 40 has three lights flashing intermittently, by using a mouse and clicking on the replicated control panel appearing on the GUI 260, the user can replicate the same three flashing lights on the GUI 260. Once the replicated control panel condition is created in the GUI 260, the local application transmits same to the diagnostic server 252, for processing by the diagnostic software engine 254. Based upon the replicated conditions generated in the GUI 260, the diagnostic software engine 254 formulates a solution to the problem, and transmits the solution to the local computer 258 for subsequent display to the user. An explanation of the error condition could also be provided to the user. Of course, the functionality provided by diagnostic software engine 254 could be provided within the local computer system 258, such that communication with the diagnostic server 252 is not necessary.

It is noted that the local computer system 258 could also include a microphone 262 and a camera 264, both or either of which could be used to obtain information about the malfunctioning equipment 266. Thus, for example, if a pump is making a high-pitched whining noise, the user could record the sound using the microphone 262 and transmit the recorded sound to the diagnostic server 252 using the local application, whereupon the recorded sound is processed by the software engine 254 (e.g., the recorded sound is compared to a database of sounds made by pumps which are indicative of various conditions) and a solution to the problem is generated and transmitted back to the local computer system 258 for display to the user. Also, for example, a picture of the current operating conditions of the equipment 266 could be taken using the camera 264, and transmitted to the diagnostic server 252. Using image processing, the software engine 254 could analyze the picture to determine the error condition, and a solution could be generated and transmitted to the local computer system 258 for display to the user.

It is noted that an entirely local solution could be provided such that the server 252 is not needed. In such circumstances, the functionality of the diagnostic software engine 254 could be provided within the application executing on the local computer system 258. Moreover, the GUI 260 could include a three-dimensional model of the user's pool/ spa, and the user could re-create the present configuration of the pool/spa and condition of associated equipment using the model. For example, the user can "drag-and-drop" representations of items such as a pool skimmer, main drain, lights, stairs, and other pool features into the model. Once the model is created, an algorithm (executing locally on the local computer system 258, or remotely on the diagnostic server 252) can analyze the model and recommend a specific manner in which to operate pool/spa equipment in order to obtain better results (e.g., it could recommend better ways of operating a pool/spa cleaner (or of programming same) based upon the model created by the user). Further, the algorithm could produce a new cleaning program based upon the model, which could be downloaded to a robotic pool cleaner (e.g., via USB, wirelessly, etc.).

Although the foregoing disclosure was discussed in connection with pools and spas, it is to be understood that the systems and methods disclosed herein could be utilized in connection with any body of water where sanitization is necessary, e.g., fountains, ponds, water features, etc.

Having thus described the invention in detail, it is to be understood that the foregoing description is not intended to limit the spirit or scope thereof. What is desired to be protected is set forth in the following claims.

What is claimed is:

1. A system for controlling chlorine output of a chlorinator and a circulation schedule of a pump, the system comprising:
   a pump operable to circulate a fluid according to a pump operation time setting;
   a chlorinator operatively coupled to the pump and through which the fluid is circulated by the pump; and
   a controller operatively coupled to the chlorinator and the pump, the controller accepting settings from a user for the pump operation time setting and a chlorine output setting, the controller being programmed to automatically control the chlorinator and the pump based on a relationship between the chlorine output setting, a chlorine generation capacity of the chlorinator, and the pump operation time setting.

2. The system of claim 1, wherein the controller is programmed to automatically control a chlorine feed rate of the chlorinator or the pump operation time setting to achieve the chlorine output.

3. The system of claim 2, wherein the controller receives an input from the user increasing the chlorine output setting and the controller is programmed to determine whether to increase the chlorine feed rate or the pump operation time setting to achieve the chlorine output setting.

4. The system of claim 3, wherein the chlorine feed rate is set to a maximum value and the controller increases the pump operation time setting.

5. The system of claim 2, wherein the controller increases the chlorine feed rate and maintains the pump operation time setting.

6. The system of claim 2, wherein the controller receives an input from the user decreasing the chlorine output setting and the controller is programmed to decrease the chlorine feed rate while the pump operation time is unchanged.

7. The system of claim 2, wherein the controller receives an input from the user decreasing pump operation time and the controller is programmed to determine whether the chlorine feed rate is adjustable to maintain the chlorine output setting.

8. The system of claim 7, wherein the controller decreases the chlorine output setting in response to a determination that the chlorine feed rate is not adjustable to maintain the chlorine output setting.

9. The system of claim 7, wherein the controller increases the chlorine feed rate in response to a determination that the chlorine feed rate is adjustable to maintain the chlorine output setting and the controller maintains the chlorine output setting.

10. The system of claim 8, further comprising:
    a control panel having a display configured to provide a visual indication of the chlorine output setting,
    wherein the controller is programmed to interact with the display to change the visual indication based on the decrease of the chlorine output setting.

11. The system of claim 1, wherein the controller controls an operation of the pump indirectly via another controller.

12. A method of controlling a chlorine feed rate of a chlorinator and operation time of a pump operatively coupled to the chlorinator, the method comprising:
    receiving an input from a user via a control panel associated with a controller operatively coupled to a chlorinator and a pump, the chlorinator having a configurable chlorine output setting, the pump having a configurable pump operation time setting; and
    controlling a chlorine feed rate and the pump based on a relationship between the chlorine output setting, a chlorine generation capacity of the chlorinator, and the pump operation time setting.

13. The method of claim 12, wherein receiving the input from the user comprises receiving an increase to the chlorine output setting and the method further comprises determining whether to increase the chlorine feed rate or the pump operation time setting to achieve the chlorine output setting.

14. The method of claim 13, wherein it is determined the chlorinator is unable to increase the chlorine feed rate to maintain the chlorine output setting and the method comprises increasing the pump operation time setting.

15. The method of claim 13, further comprising increasing the chlorine feed rate
and maintaining the pump operation time setting.

16. The method of claim 12, wherein receiving the input from the user comprises receiving a decrease to the chlorine output setting and the method further comprises determining whether to decrease the chlorine feed rate or the pump operation time setting to achieve the chlorine output setting.

17. The method of claim 16, further comprising decreasing the chlorine feed rate and maintaining the pump operation time setting.

18. The method of claim 16, further comprising decreasing the pump operation time setting and maintaining the chlorine feed rate.

19. The method of claim 16, further comprising decreasing the pump operation time setting and decreasing the chlorine feed rate.

20. The method of claim 12, wherein receiving the input from the user comprises receiving a decrease to the pump operation time setting and the method further comprises determining whether the chlorine feed rate is adjustable to maintain the chlorine output setting.

21. The method of claim 20, further comprising:
    increasing the chlorine feed rate in response to a determination that the chlorine feed rate is adjustable to maintain the chlorine output setting; and
    maintaining the chlorine output setting.

22. The method of claim 20, further comprising:
   determining that the chlorine feed rate is not capable of being adjusted to maintain the chlorine output setting; and
   decreasing the chlorine output setting.

23. The method of claim 22, further comprising:
   changing a visual indication on a display of the control panel based on a decrease of the chlorine output setting.

24. The method of claim 12, wherein controlling the chlorinator and the pump comprises executing code by the controller that is operably coupled to the chlorinator and the pump to implement a control process, wherein the controller controls an operation of the pump indirectly via another controller.

25. A method of determining a chlorine feed rate of a chlorinator and a schedule of operation for a pump operatively coupled to the chlorinator, the method comprising:
   receiving an input from a user to adjust a chlorine output setting via a control panel associated with a controller operatively coupled to a chlorinator and a pump, the chlorinator having a configurable chlorine feed rate setting, the pump having a configurable pump operation time setting;
   determining at least one of the chlorine feed rate setting or the pump operation time setting to be set to achieve the chlorine output setting; and
   indicating to the user that an adjustment of at least one of a chlorine feed rate or the pump operation time setting is required to achieve the chlorine output setting.

26. The method of claim 25, wherein indicating to the user that an adjustment of at least one of the chlorine feed rate or the pump operation time setting is required to achieve the chlorine output setting comprises prompting the user via the control panel to increase at least one the chlorine feed rate or the pump operation time setting in response to receiving an input to increase the chlorine output setting.

27. The method of claim 25, wherein indicating to the user that an adjustment of at least one of the chlorine feed rate or the pump operation time setting is required to achieve the chlorine output setting comprises prompting the user via the control panel to decrease at least one the chlorine feed rate or the pump operation time setting in response to receiving an input to decrease the chlorine output setting.

* * * * *